(12) United States Patent
Sirkar et al.

(10) Patent No.: US 10,843,133 B2
(45) Date of Patent: Nov. 24, 2020

(54) SEPARATION OF ORGANIC SOLVENT MIXTURES

(71) Applicants: Kamalesh Sirkar, Bridgewater, NJ (US); Prithish Basak, Harrison, NJ (US); John Chau, Belleville, NJ (US)

(72) Inventors: Kamalesh Sirkar, Bridgewater, NJ (US); Prithish Basak, Harrison, NJ (US); John Chau, Belleville, NJ (US)

( * ) Notice: Subject to any disclaimer, the term of this patent is extended or adjusted under 35 U.S.C. 154(b) by 0 days.

(21) Appl. No.: 16/521,280

(22) Filed: Jul. 24, 2019

(65) Prior Publication Data
US 2020/0030746 A1  Jan. 30, 2020

Related U.S. Application Data

(60) Provisional application No. 62/702,507, filed on Jul. 24, 2018.

(51) Int. Cl.
*B01D 61/02* (2006.01)
*B01D 71/36* (2006.01)

(52) U.S. Cl.
CPC .......... *B01D 61/025* (2013.01); *B01D 71/36* (2013.01); *B01D 2325/04* (2013.01); *B01D 2325/20* (2013.01); *B01D 2325/38* (2013.01)

(58) Field of Classification Search
None
See application file for complete search history.

(56) References Cited

U.S. PATENT DOCUMENTS 4,990,275 A    2/1991  Ho et al.
5,051,114 A *  9/1991  Nemser ............... B01D 53/228
                                                      95/47
(Continued)

FOREIGN PATENT DOCUMENTS

WO   WO-9209353 A1 *  6/1992  ......... B01D 39/1623

OTHER PUBLICATIONS

Pinnau et al, "Gas and vapor transport properties of amorphous perfluorinated copolymer membranes based on 2,2-istrifluoronnethyl-4,5-difluoro-1,3-dioxole/ tetrafluoroethylene", Journal of Membrane Science l 09 ( 1996) 125-1 33.*

(Continued)

*Primary Examiner* — Krishnan S Menon
(74) *Attorney, Agent, or Firm* — Gerhart Law LLC

(57) ABSTRACT

Reverse osmosis (RO) separation of organic solvent mixtures where solvent molecular weights <100 Da is challenging especially for powerful solvents that swell most uncrosslinked polymers. To avoid polymer swelling by solvents, a particular perfluoropolymer, perfluoro-2,2-dimethyl-1,3-dioxole copolymerized with tetrafluoroethylene, (PDD-TFE), designated CMS-7, was studied. This amorphous glassy extremely hydrophobic copolymer has a very high free volume (FV) fraction. The maximum radial dimension of FV regions is less than ~0.65 nm allowing only single solvent molecule permeation. Further, interactions between polarity, dimensions and shapes of solvent molecules with those of polymer FV elements can lead to extraordinarily selective permeation. Permeation behaviors of other solvent mixtures, toluene-n-heptane, NMP-tetrahydrofuran, methanol-water, ethanol-water as well as individual phases of the immiscible mixture of NMP and the nonpolar solvent n-heptane were also studied.

15 Claims, 16 Drawing Sheets

(56) References Cited

U.S. PATENT DOCUMENTS

| | | | | |
|---|---|---|---|---|
| 5,173,191 | A * | 12/1992 | Black | B01D 61/025 210/490 |
| 5,234,597 | A * | 8/1993 | Welmers | B01D 61/025 210/634 |
| 6,770,202 | B1 * | 8/2004 | Kidd | B01D 53/228 210/321.6 |
| 2015/0298997 | A1 * | 10/2015 | Shimizu | B01D 63/14 210/640 |

OTHER PUBLICATIONS

E. Muller, "NMP (Arosolvan) Process for BTX Separation," Chap. 18.2.1 in Malcolm H.I. Baird and C. Hanson, "Handbook of Solvent Extraction," 1991, pp. 523-529, Krieger Publishing Company, Malabar, FL.

Basf, "Butadiene Extraction Technology," 2016, pp. 1-2, Chicago Bridge & Iron Company.

Koh Dy, et al., "Reverse Osmosis Molecular Differentiation of Organic Liquids Using Carbon Molecular Sieve Membranes," Science, Aug. 19, 2016, pp. 804-807, 353(6301).

Adel S. Al-Jimaz, et al., "Extraction of Aromatics from Middle Distillate Using N-Methyl-2-Pyrrolidone: Experiment, Modeling, and Optimization," Ind. Eng. Chem. Res., Jul. 25, 2007, pp. 5686-5696, 46(17).

H.L. Fleming, et al., "Pervaporation," in Winston Ho, et al., "Membrane Handbook," 1992, Van Nostrand Reinhold, New York.

P. Shao, et al., "Polymeric Membrane Pervaporation," Journal of Membrane Science, Jan. 15, 2007, pp. 162-179, 287(2).

Pieter Vandezande, et al., "Solvent Resistant Nanofiltration: Separating on a Molecular Level," Chemical Society Reviews, 2008, pp. 365-405, 37.

John Tang, et al., "Perfluoropolymer Membrane Behaves Like a Zeolite Membrane in Dehydration of Aprotic Solvents," Journal of Membrane Science, 2012, pp. 211-216, 421-422.

John Chau, et al., "Performance of a Composite Membrane of a Perfluorodioxole Copolymer in Organic Solvent Nanofiltration," Separation and Purification Technology, 2018, pp. 233-241, 199.

Agnieszka Dobrak-Van Berlo, et al., "Parameters Determining Transport Mechanisms through Unfilled and Silicalite Filled PDMS-based Membranes and Dense PI Membranes in Solvent Resistant Nanofiltration: Comparison with Pervaporation," Journal of Membrane Science, May 2011, pp. 138-140, 374(1-2).

D. Bhanushali, et al., "Performance of Solvent-Resistant Membranes for Non-Aqueous Systems: Solvent Permeation Results and Modeling," Journal of Membrane Science, Jul. 31, 2001, pp. 1-21, 189.

A. Buekenhoudt, et al., "Unravelling the Solvent Flux Behaviour of Ceramic Nanofiltration and Ultrafiltration Membranes," Journal of Membrane Science, Jul. 15, 2013, pp. 36-47, 439.

A. Yu Alentiev, et al., "High Transport Parameters and Free Volume of Perfluorodioxole Copolymers," Journal of Membrane Science, Apr. 2, 1997, pp. 123-132, 126.

John Tang, et al., "Permeation and Sorption of Organic Solvents and Separation of their Mixtures through an Amorphous Perfluoropolymer Membrane in Pervaporation," Journal of Membrane Science, Nov. 15, 2013, pp. 345-354, 447.

Santanu Karan, et al., "Composite Membranes for Filtering Solvents," Science, Jun. 19, 2015, pp. 1347-1351, 348 (6241).

Hyeong Taek Ham, et al., "An Explanation of Dispersion States of Single-Walled Carbon Nanotubes in Solvents and Aqueous Surfactant Solutions Using Solubility Parameters," Journal of Colloid and Interface Science, Jun. 1, 2005, pp. 216-223, 286 (1).

F.W. Greenlaw, et al., "Dependence of Diffusive Permeation Rates on Upstream and Downstream Pressures: II. Two Component Permeant," Journal of Membrane Science, 1977, pp. 333-348, 2.

T.C. Merkel, et al., "Gas Soprtion, Diffusion, and Permeation in Poly(2,2-bis(trifluoromethyl)-4,5-difluoro-1,3-dioxole-co-tetrafluoroethylene)," Macromolecules, 1999, pp. 8427-8440, 32 (35).

P. Marchetti, et al., "Molecular Separation with Organic Solvent Nanofiltration: A Critical Review," Chem. Rev., 2014, pp. 10735-10806, 114.

X. Li, et al., "AF2400/PTFE Composite Membrane for Hexane Recovery During Vegetable Oil Production," Separation and Filtration Technology, 2017, pp. 223-229, 181.

S. Karan, et al., "Sub-10 nm Polyamide Nanofilms with Ultrafast Solvent Transport for Molecular Separation," Science, 2015, pp. 1347-1351, 348.

H.T. Ham, et al., "An Explanation of Dispersion States of Single-Walled Carbon Nanotubes in Solvents and Aqueous Surfactant Solutions Using Solubility Parameters," J. Colloid and Interface Science, 2005, pp. 216-223, 286.

J. Tang, et al., "Pervaporative Dehydration of Concentrated Aqueous Solutions of Selected Polar Organics by Periluoropolymer Membrane," Separation and Purification Technology, 2017, pp. 122-129, 175.

J.C. Jansen, et al., "Organic Vapour Transport in Glassy Perfluoropolymer Membranes: A Simple Semi-Quantitative Approach to Analyze Clustering Phenomena by Time Lag Measurements," J. Membrane Sci., 2011, pp. 141-151, 367.

* cited by examiner

SEPARATION OF ORGANIC SOLVENT MIXTURES

CLAIM OF PRIORITY

This application claims priority to U.S. Application 62/702,507 filed on Jul. 24, 2018, the contents of which are fully incorporated herein by reference in its entirety.

FIELD OF THE EMBODIMENTS

The present disclosure and its embodiments relate to the separation of mixtures. In particular, the present disclosure relates to the separation of organic solvent mixtures via reverse osmosis.

BACKGROUND OF THE EMBODIMENTS

In chemical, petrochemical, and pharmaceutical industries, individuals often separate organic solvent mixtures, which contain larger polar aprotic solvents mixed with other organic solvents, which are aromatic, aliphatic hydrocarbons, alcohols, etc. Typical examples of the latter are toluene, heptane, hexane, octane, ethanol, methanol, ethyl acetate, etc. It would be desirable to apply pressure on a feed solvent mixture containing various combinations of these solvents such that one of the solvents permeates through a reverse osmosis membrane selectively in preference to the other solvent. A thermally based process of distillation should be avoided, especially if thermally unstable compounds are present in the system. That is certainly true if the thermally unstable compounds are active pharmaceutical ingredients (APIs). Considering that distillation is quite energy intensive, there is a need for a membrane process, which would require a very small device, require much less energy, and be simple to operate.

Reverse osmosis (RO) separation of organic solvent mixtures where solvent molecular weights <100 Dalton (Da) is challenging especially for powerful solvents that swell most uncrosslinked polymers.

Various devices for separating mixtures are known in the art. However, their structure and means of operation are substantially different from the present disclosure. The other inventions also fail to solve all the problems taught by the present disclosure. At least one embodiment of this invention is presented in the drawings below and will be described in more detail herein.

SUMMARY OF THE EMBODIMENTS

In accordance with one embodiment of the present disclosure, to avoid polymer swelling by solvents, a particular perfluoropolymer, perfluoro-2,2-dimethyl-1,3-dioxole copolymerized with tetrafluoroethylene, (PDD-TFE), designated CMS-7, is disclosed. This amorphous glassy extremely hydrophobic copolymer has a very high free volume (FV) fraction. The average dimension of FV regions is less than ~0.65 nm allowing only single solvent molecule permeation. Further, interactions between polarity, dimensions, and shapes of solvent molecules with those of polymer FV elements can lead to extraordinarily selective permeation.

One embodiment of a reverse osmosis (RO) based separation of the following binary systems through a thin 1.67 μm film of this polymer supported on an e-PTFE support is disclosed over 1000-3500 kPa feed pressure: N-Methyl-2-pyrrolidone (NMP)-toluene; dimethylformamide (DMF)-toluene; dimethylsulfoxide (DMSO)-toluene; NMP-methanol; n-butanol-ethanol. Pure toluene appeared as permeate for three polar aprotic-aromatic systems from highly toluene-rich feeds; the membrane rejected polar aprotic molecules having dimensions similar to those of toluene. High osmotic pressure of the feed mixtures employed vis-à-vis feed pressures used reduced toluene permeation flux and the range of separable feed mixtures.

Pure methanol permeate was obtained from particular polar aprotic-polar protic NMP-methanol mixtures due to significantly smaller methanol dimensions. Pure ethanol permeate was also similarly obtained from a particular mixture with n-butanol, a case of polar protic1-polar protic2 system where ethanol molecules were smaller. Such clean-cut pressure-driven separations may be due to various combinations of the dimensions of the solvent molecules and the polymer FV regions, high polymer hydrophobicity, polarity of the aprotic/protic solvents and very low swelling of the polymer. Sorption studies of dense polymer samples for polar aprotic solvents, NMP, DMF, DMSO, yielded very low levels of sorption, 0.4-0.9 wt. %; those for toluene and methanol were already known to be only 1.34 and 1.2 wt. % respectively. Permeation behaviors of other solvent mixtures, toluene-n-heptane, NMP-tetrahydrofuran, methanol-water, ethanol-water as well as individual phases of the immiscible mixture of NMP and the nonpolar solvent n-heptane are also disclosed. To improve understanding, permeation of pure water in reverse osmosis mode was also investigated.

In one embodiment of the present invention there is a method to separate organic solvent mixtures, the method comprising the steps of: providing a binary solvent mixture of a polar aprotic solvent and a non-polar solvent; and, employing a perfluorodioxole membrane to separate the binary solvent mixture.

In yet another embodiment of the present invention there is a reverse osmosis method to separate organic solvent mixtures, the method comprising the steps of: providing a solvent mixture comprising a polar aprotic solvent and a non-polar solvent, wherein a molecular weight of the polar aprotic solvent and the non-polar solvent is each less than 100 Da; providing a hydrophobic membrane configured to separate the solvent mixture; and applying a pressure of at least 1000 kPA to the solvent mixture. The method may further comprise the step of separating the solvent mixture into at least the polar aprotic solvent and the non-polar solvent, wherein the non-polar solvent permeates the hydrophobic membrane, and wherein the polar aprotic solvent does not permeate the hydrophobic membrane.

Any combination and/or permutation of the embodiments is envisioned. Other objects and features will become apparent from the following detailed description considered in conjunction with the accompanying figures and drawings herein. It is to be understood, however, that the figures and drawings are designed as an illustration only and not as a definition of the limits of the present disclosure.

In general, the present invention succeeds in conferring the following, and others not mentioned, benefits and objectives.

It is an object of the present invention to provide a method of reverse osmosis that is applicable to a wide range of organic mixtures.

It is an object of the present invention to provide a method of reverse osmosis that allows for permeation of a non-polar solvent of the organic mixture through the membrane.

It is an object of the present invention to provide a method of reverse osmosis that separates organic mixtures comprising components having a molecular weight of less than 100 Da.

It is an object of the present invention to provide a method of reverse osmosis that allows for highly selective permeation of toluene.

It is an object of the present invention to provide a method of reverse osmosis that permeates smaller polar, protic solvents from its mixture with larger polar, aprotic solvents.

DESCRIPTION OF THE PREFERRED EMBODIMENTS

Figure 1:
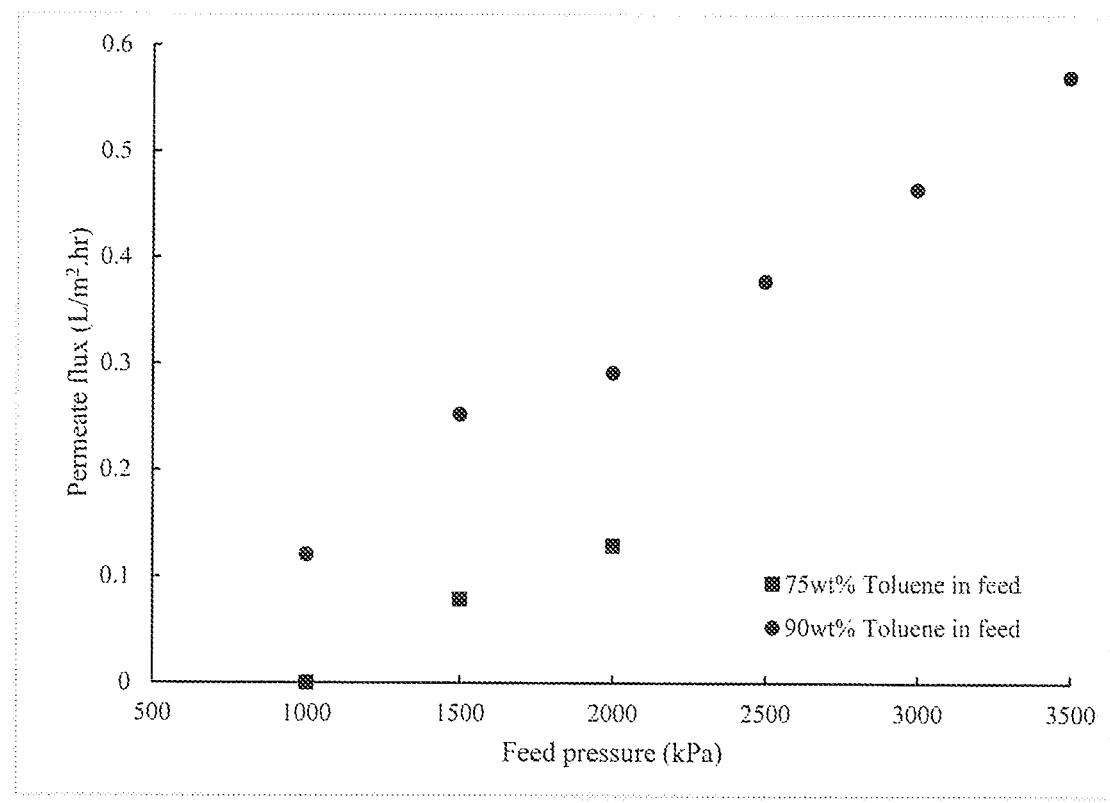
FIG. 1 is a chart illustrating permeate flux ($L/m^2$-hr) vs. feed solution pressure for NMP-toluene run through a composite CMS 7 membrane having a thickness of 1.67 μm for two different feed compositions.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Exemplary embodiments are directed to reverse osmosis separation of certain organic solvent mixtures and a perfluorodioxole copolymer membrane. It should be understood that the embodiments described herein can generally be applied to other organic solvent mixtures and membranes.

In pharmaceutical synthesis, solvent exchange processes often involve mixtures of an aprotic solvent, such as N-Methyl-2-pyrrolidone (NMP), dimethylformamide (DMF), dimethylsulfoxide (DMSO) and dimethylacetamide (DMAc), with other organic solvents. These solvents can be aromatics, alcohols, aliphatics, esters, etc. The solvent mixture contains usually a pharmaceutical intermediate or a product. An athermal technique is preferred for separating the aprotic solvent from other organic solvents. A suitable membrane to achieve separation would be quite useful.

In petroleum refinery and petrochemical plants, there are a number of industrial processes, such as aromatics extraction (Muller, 1991 [1]; Al-Jimaz et al., 2007 [2]), butadiene recovery (BASF, 2016 [3]), lube oil purification etc., where NMP or another polar aprotic solvent is used as an extraction solvent in several industrial processes because of its affinity for aromatics and unsaturated hydrocarbons. After extraction, the extracting solvent (e.g., NMP) is separated from the extract and recycled as the extracted species are separated simultaneously. Instead of thermal/distillation-based processes, a membrane process to separate the extracted aromatics (for example) from NMP/aprotic extracting solvent is likely to be quite efficient. It is desirable to permeate the extracted aromatics (minor component) over NMP, for example. It will be understood that other extracting solvents could be used.

Permeation-based separation of organic solvent mixtures through dense polymeric membranes has been studied in the last 20-25 years using primarily pervaporation. Separation systems studied fall in three categories: 1) organic solvent dehydration; 2) removal of organics from water; and 3) organic-organic separation (see chapters by Fleming and Slater (1992; 2001) [4] and the review by Shao and Huang (2007) [5]). Organic-organic systems studied include—polar/non-polar (e.g., methanol/MTBE), aromatic/paraffin (e.g., benzene/n-hexane), olefin/paraffin, aromatic/alicyclic, isomers, e.g., isomers of xylene, purification from dilute streams (IPA (9%) from heptane/hexane), etc. A high selectivity of >900 was reported for the last system; large-scale use of the first system has also been reported (Fleming and Slater, 2001 [4]).

This last system had components that are quite apart in their inherent solvent properties such as polarity/nonpolarity. For solvents that are not too far apart, the selectivities are unlikely to be that high. A literature review for benzene/n-hexane (Shao and Huang (2007) [5]) shows a maximum selectivity of 40. Ho et al. (1991) [6] achieved a selectivity of less than 20 by pervaporation for toluene/isooctane system (an example of an aromatic/saturate mixture) from a copolymer-based membrane having the hard segment of a polyimide and the soft segment of an oligomeric aliphatic polyester; the selectivity went down as the feed temperature went up.

However, none of these systems deal with separation of high-boiling aprotic solvents of limited volatility (boiling point: NMP, 204° C.; DMF, 189° C.; DMSO, 154° C. etc.) from other organic solvents. One of the reasons for a paucity of pervaporation-based studies of systems containing high-boiling polar aprotic solvents is that very few polymers can withstand polar aprotic solvents. Diamine-crosslinked polyimide membranes recently developed (Marchetti et al., 2014) [7] for organic solvent nanofiltration (OSN) however can handle these polar aprotic organic solvents. This and other reviews (Vandezande et al., 2008) [8] provide detailed accounts of a variety of membranes studied for OSN.

The senior inventor of the present application has studied pervaporation-based removal of a small amount of water from the following polar aprotic solvents, DMF, DMAc, DMSO through a particular perfluorodioxole copolymer membrane, CMS-3 (Tang and Sirkar, 2012) [9]. This polymer is completely stable in such polar aprotic solvents as well as all other organic solvents except perfluorosolvents. This polymer needs no special cross-linking or other treatments. Organic solvent nanofiltration (NF) studies using thin composite membranes of a somewhat different variety of this perfluorodioxole copolymer, CMS-7, have been implemented (Chau et al., 2018) [10]. The dye solutes whose rejections were studied included Safranin O (MW, 351 Da) and Brilliant Blue R (MW, 826 Da). Very high rejections of these solutes in the range of 95-99%+ were observed for two solvents, methanol and THF. The present inventors are not aware of any separation studies using this type of perfluoropolymer membrane where pressure-driven permeation occurs in a reverse osmosis process from a mixed organic solvent feed whose components have molecular weights less than 100; further one of the components is a polar aprotic organic solvent.

Consider the literature on mixed solvent permeation through membranes especially organic solvent nanofiltration membranes. It is generally perceived that there is no selectivity. Dobrak-Van Berlo et al. (2011) [11] studied the permeation of a variety of solvent mixtures through OSN membranes of poly (dimethyl siloxane) (PDMS), zeolite-filled PDMS and polyimide. The solvent mixtures included toluene-isopropyl alcohol (20:40, 40:60, 60:40 mixtures), 40:60 mixtures of THF with NMP, DMF, DMSO etc. There is no mention of development of any selectivity between the different solvents. Earlier studies of solvent permeation through similar PDMS-based membranes (see Bhanusali et al., 2001 [12]) did not feel any need to explore separation of organic solvent mixtures presumably because none was expected. Recent NF investigation of various mixtures of toluene and heptane through a particular perfluorodioxole copolymer (CMS-7) by Chau et al. (2018) [10] did not also show any selectivity in the permeate vis-à-vis the feed mixture. Selective RO-based permeation is explored in the present disclosure through a composite CMS-7 membrane for a variety of other organic solvent mixtures.

The experimental study by Buekenhoudt et al. (2013) [13] of solvent permeation through a series of ceramic nanofiltration and ultrafiltration membranes of pore diameter from 0.9 nm upwards is of interest here. For their regular hydrophilic membranes, they observed that "the hexane flux of a hydrophilic nanofiltration membrane, measured directly after the water flux, is observed to be zero, even after soaking the membrane in hexane in between the water and hexane flux measurements. However, the hexane flux is non-zero after the permeation of a solvent such as, ethanol which is fully miscible with hexane. We tentatively explained the zero-hexane flux after water permeation as due to wetting of the membrane pores with water, immiscible with hexane [32]," where [32] is from Bertels (2004) [14]. They have further observed that "the water flux measured on a dry hydrophobic membrane (such as the 3 nm $ZrO_2$ HOC membrane) is zero. However, if water flux is measured directly after ethanol permeation, a non-zero water flux value is noted. Again, this could be explained by the wetting of the membrane pores with ethanol, allowing water to permeate the membrane, despite its hydrophobicity [34]" where [34] is from Vangeel (2005) [15].

The perfluoropolymer membrane of interest here in the present disclosure, namely, CMS-7, is extremely hydrophobic. Further, the dimensions of free volume (FV) are considerably smaller than those of Buekenhoudt et al. (2013) [13]. The average dimensions of the free volume elements in the perfluorodioxole copolymer of interest, CMS-7 and a related copolymer CMS-3 are ~<0.65 nm (Alentiev et al., 1997) [16]. Therefore, molecular transport of larger solvent molecules, such as NMP, will be at the level of a single molecule. The same is true of other larger polar aprotic solvents, DMF, DMAc, DMSO. If one considers the minimum dimension of a variety of organic solvents (e.g., methanol, ethanol, isopropanol, tetrahydrofuran, dichloromethane, DMF, acetonitrile, toluene, ethyl acetate, heptane, hexane), it varies between 0.42 to 0.54 nm (Buekenhoudt et al., 2013) [13]. Therefore, unless the perfluoropolymer material swells very significantly, the pressure-driven transport/permeation for each of the listed solvent is likely to be at the level of a single molecule.

In pervaporation studies by Tang and Sirkar (2012) [9], there was a very small flux of each of the three aprotic solvents, DMF, DMAc, DMSO, through a related somewhat tighter perfluoropolymer membrane, CMS-3. Since water flux was considerably higher, the membranes displayed very high selectivity for water over these polar aprotic solvents. On the other hand, for the slightly more open perfluoropolymer membrane of the CMS-7 variety, the recently observed behaviors of pure solvent fluxes are quite important [10]. The flux of pure solvent DMSO was found to be around 60 times smaller than that for toluene [10]. The dimensions of toluene are not too different from that of DMSO (as will be shown later); the distinguishing characteristics must be the strong polarity of DMSO and its adverse interaction with the strongly hydrophobic perfluoropolymer membrane material. It is useful therefore to explore the separation of mixtures of toluene with various polar aprotic solvents e.g., DMSO, NMP, DMF, etc.

Correspondingly, the present inventors have already seen that other polar or nonpolar solvents (e.g., methanol, ethanol, ethyl acetate, n-heptane, tetrahydrofuran (THF)) display significant permeation flux with such perfluorodioxole copolymer membranes (e.g., CMS-7; see Chau et al., 2018 [10]).

There is therefore a possibility that from mixtures of larger polar aprotic solvents with other common smaller or otherwise organic solvents polar or nonpolar, we may observe considerable selectivity in favor of these other solvents against the larger polar aprotic solvents. The present disclosure investigates this hypothesis using the following larger polar aprotic solvent, NMP, in its mixtures with solvents, such as methanol, THF, and heptane. The membrane material is CMS-7 (FORMULA-1); it is used as a composite over a solvent-resistant ePTFE substrate.

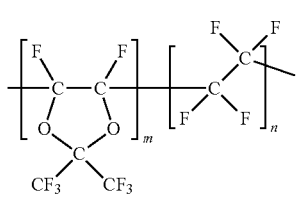

FORMULA-1

PDD-TFE copolymer CMS-7 with m-number of groups of perfluoro-2,2-dimethyl-1,3-dioxole and n-number of groups of tetrafluoroethylene.

This polymer material is a member of a class of hydrophobic perfluoropolymers developed at DuPont; some of them have been studied for gas separation. It will be understood that other types of membranes could be employed. For example, membranes prepared from the perfluoropolymers AF2400, Hyflon® AD, CMS-3, AF 1600 etc. are potential candidates for RO separation of the organic solvent mixtures under consideration here in the present disclosure.

Given the dimensions of the free volume regions of the perfluoropolymer CMS-7 and other such polymers such as AF2400 and their inherent resistance to swelling by organic solvents, the question of solubilization-facilitated transport probably does not arise unless there is considerable swelling. Alternately, if the highest free volume dimensions of this hydrophobic polymer cannot accommodate two separate molecules at any location, we can expect significant selectivity under proper conditions.

An additional aspect involves separation involving two protic solvents, such as n-butanol and ethanol. Both are polar but n-butanol is significantly longer than ethanol. How would these molecular dimensions interact with the FV dimensions of the somewhat rigid polymer of the present disclosure is of some interest?

A related question concerns the selective transport from feed mixtures of water with other organics such as methanol or even a saline water through such membranes. Although there is very high-water vapor transport through such membranes in pervaporation (Tang et al., 2012 [9]; Tang et al., 2017 [17]), it would be illuminating to explore what happens in the RO mode.

Black (1992) [18] disclosed that interfacially polymerized polyamide membranes on a solvent-resistant ultrafiltration membrane support were able to permeate preferentially polar organic solvents e.g., NMP, DMF, DMSO etc. selectively over oils (molecular weight (MW)~400 Da) via reverse osmosis membrane and process. This is an NF process, not a RO process. The present inventors explore here in the present disclosure a very different possibility: low MW (<100 Da) solvents permeate through a membrane rejecting low MW polar aprotic solvents, such as NMP, DMF, DMSO, DMAc, etc.

After this work was finished, a study on OSN came to the attention of the present inventors where a related perfluoropolymer material, AF 2400, was used as a composite NF membrane to recover hexane from a crude mixture of soybean oil and hexane (Li et al., 2017 [19]); molecular weights of solutes rejected were 350 Da upwards. This polymer has a value of m=0.87 and n=0.13 and a high fractional free volume (FFV) of 0.327. The perfluoropolymer variety used here, CMS-7, has slightly different values of m and n [16, 20] and a higher FFV of 0.374 [16]. Further, the present inventors are exploring separation of solvent mixtures whose molecular weights are less than 100; this is unlike all OSN studies in literature.

The present inventors are engaged in RO separation of low molecular weight solvent mixtures. However, the feed pressures of the present inventors are on the low side. The highest feed pressure is 3500 kPa. It will be understood that there is no limitation to using higher feed-side pressures including those about 3500 kPA and higher.

Experimentals

The materials and the methods of the present disclosure used in at least one embodiment will be described below. While the embodiment(s) discusses the use of specific compounds and materials, it is understood that the present disclosure could employ other suitable materials. Similar quantities or measurements may be substituted without altering the method embodied below.

Materials and Chemicals

The perfluoro membrane material used here is an amorphous glassy copolymer, perfluoro-2,2-dimethyl-1,3-dioxole copolymerized with tetrafluoroethylene (PDD-TFE) denoted as CMS-7; 1.67 μm thick CMS-7 membrane cast on a porous ePTFE substrate (KB162903-A) was purchased from Compact Membrane Systems, Wilmington, Del. The studies were conducted in a 25-mm stainless steel holder (Model XX4502500, MilliporeSigma Corporation, Billerica, Mass.). The effective membrane area in this flat membrane cell was ~1.8 cm$^2$. Membrane samples were punched out of large flat sheets. The membrane sample in the cell was supported by a porous s. steel disk and sealed by a PTFE O-ring. The present inventors purchased also 25 μm thick CMS-7 sheets ((JL215-7-1) from Compact Membrane Systems for sorption studies.

The polar protic solvents used in various mixtures were: methanol (EMD Millipore, >99.8%), ethanol (Acros Organics, 99.5% ACS reagent), n-butanol (Acros Organics, 99.5%). The polar aprotic solvents were: dimethyl formamide (Fischer Chemical, 99.9%), n-methyl pyrrolidone (Acros Organics, HPLC grade, 99.5%), DMSO (Acros Organics, 99.9+% ACS reagent), tetrahydrofuran (Sigma Aldrich, >99.9%). The nonpolar solvents for mixture runs were: n-heptane (Acros Organics, 99%), toluene (Fischer Scientific, 99.8%).

Methods

The solvent/solvent mixture was introduced into the cell on the feed side of the membrane from a 75 cm$^3$ s. steel reservoir driven by pressure from a N$_2$ gas cylinder. The temperature was 25° C. Each run was conducted for at least 5 hr.; often the run lasted for 24-48 hr. The cell was essentially a dead-end cell without stirring. In conventional OSN, one would expect significant concentration polarization requiring a crossflow configuration. However, due to the nature of the material, the membrane thickness and the pressure levels employed, the permeation rates were quite low. Concentration polarization was expected to be of limited extent (see [10]); the stage cut was also very low. These have been discussed further herein. The runs were repeated at least twice. The amount of permeate collected in a sealed container was determined by weighing the container and measuring the difference with the empty container.

For solvent mixture studies, calibrations were developed in a gas chromatograph (GC) using external standards. The GC used was HP 6890 Series with a flame ionization detector. The column was DB 5 ms (Agilent, Santa Clara, Calif.). The GC temperature program for analyzing the following systems, DMF-toluene, NMP-THF, NMP-MeOH, n-butanol-EtOH, MeOH-water, and EtOH-water, was: 50° C. for 3 min; 50° C. to 250° C. at a rate of 30° C./min and then held at 250° C. for 3 min. For analyzing mixtures of toluene-NMP, NMP-heptane, GC temperature program employed was: 100° C. for 3 min; then temperature was raised to 250° C. at a rate of 75° C./min and held there for 3 min. For analyzing DMSO-toluene system, the conditions were: 60° C. for 3 min; then it was raised to 220° C. at a rate of 30° C./min and held there for 5 min. For analysis of heptane-toluene, the conditions were: 100° C. for 3 min; temperature was then raised to 140° C. at a rate of 35° C./min and held there for 5 min. The diluent used in sample analysis for non-DMF containing systems was DMF. For DMF-containing systems, the diluent was THF. Calibrations for GC analysis of all mixtures are provided in supplementary information (SI).

Heptane and NMP form two phases when mixed. The following procedure was adapted for this system. A certain volume of NMP and heptane were poured into a vessel and stirred with a magnetic stir bar for 2 hr. Then the two layers were allowed to separate. The bottom layer was highly NMP-rich since NMP has some solubility for heptane. The top layer was essentially heptane. These layers were withdrawn by a syringe and analyzed in the GC. Both the bottom layer and the top layer were then separately used as the feed solution in the permeation setup; the permeation rate was measured and the permeate composition was determined by the GC.

A calibration curve was constructed for determining the methanol concentration in a methanol-water mixture. Methanol concentration (wt. %) in the permeate was determined from the calibration. Permeate water concentration (wt. %) was calculated from the equation below: Permeate water concentration (wt. %)=100−Permeate methanol concentration (wt. %). A similar procedure was carried out for ethanol-water mixtures.

Results

At the beginning, the present inventors consider various properties of solvents used and then provided estimates of osmotic pressures for some of the systems as a background for the results in a few systems. The results for the various systems studied are presented next in the following order: Polar aprotic-toluene systems (NMP-toluene; DMF-toluene; DMSO-toluene); NMP-methanol; n-butanol-ethanol; n-heptane-toluene; NMP-n-heptane; NMP-THF; methanol-water; ethanol-water. Pure water and saline water were also studied. At the end, concentration polarization is discussed for some of the systems. Contact angles of most of the solvents and composite membrane structure are available in [10].

The present inventors consider first data on the properties of various solvent molecules. The values of Hansen solubility parameter can be obtained from [13], [21] and [22] among others. Clearly, water has the largest value followed by methanol, DMSO, ethanol, DMF, DMAC, NMP, and others. It is well known that kinetic diameter instead of the diameter of a spherical molecule is more useful in determining the effective dimension in permeation processes through very narrow openings. However, such values are not readily available for many of the solvents under consideration [13]. The senior inventor had earlier estimated the smallest and longest dimensions of most of the solvents under consideration here in the present disclosure by using WaveFunction Spartan, a commercial software package for molecular modeling and computations. The present inventors have consolidated those results [9, 17, 23] providing estimates of the smallest and the longest dimensions most of the selected solvents. These estimates are useful in understanding the observed permeation behavior of selected solvent pairs being separated. The values from the spherical model are usually larger.

Considerations on Osmotic Pressure

In reverse osmosis process, the solvent flux is linearly proportional to the net driving force ($\Delta P - \Delta \pi$) for a perfectly rejected solute. It is useful to develop approximate estimates of the osmotic pressures of some of the solutions studied. Table 1 provides such estimates for a few solutions, those that are more dilute than others for the same mixed solvent system. These values were calculated using Van't Hoff equation, $$\pi = C_i RT$$

where $C_i$ refers to the molar concentration of the rejected solute species i. Since the highest pressure used in this study for quite a few systems was 3500 kPa, it is clear that the net driving forces for these systems will not be high. Therefore, solvent fluxes are going to be on the low side even though the magnitudes of the solvent fluxes are influenced by a host of other factors.

TABLE 1

Estimates of osmotic pressure of a few feed solutions

| Mixture system | Feed solution composition | Estimated osmotic pressure of solution of the rejected solute* (kPa) |
|---|---|---|
| Toluene-NMP | 90 wt % Toluene-10 wt % NMP | 2193 |
| Toluene-DMF | 90 wt % Toluene-10 wt % DMF | 2963 |
| Toluene-DMSO | 90 wt % Toluene-10 wt % DMSO | 2799 |
| MeOH-NMP | 90 wt % MeOH-10 wt % NMP | 2026 |
| EtOH-n-butanol | 90 wt % EtOH-10 wt % n-butanol | 2631 |

*based on Van't Hoff equation at 296 K

Polar Aprotic-Toluene Systems

The present inventors first report performances of a composite CMS-7 membrane exposed to four feed mixtures having compositions between NMP (75 wt. %)-toluene (25 wt. %) and NMP (10 wt. %)-toluene (90 wt. %) for feed pressures ranging between 1000 and 3500 kPa. A most important result is that if there was steady permeate production, permeate was pure toluene unless stated otherwise. FIG. 1 illustrates the solvent permeation flux as a function of the feed pressure for two different feed compositions, 90 wt. % and 75 wt. % of toluene. For each of these feed solutions, the permeation flux increases linearly with the feed pressure.

The solvent permeation flux depends on the applied pressure difference ($\Delta P$) exceeding the osmotic pressure difference ($\Delta \pi$) of the solutions on the two sides. Since an estimate (Table 1) of the osmotic pressure of a 10 wt. % NMP-90 wt. % toluene is 2193 kPa, we are unlikely to see any permeation at low feed pressures. The highest observed flux for this composition is approaching 0.6 L/m²·hr at 3500 kPa feed pressure. No flux was observed over a 24-hr period for a feed containing 50 wt. % toluene. The osmotic pressure of such a feed solution would be very high requiring much higher feed pressure for any permeation. Performance over a longer period is unknown. FIG. 1 does not report the much higher flux of pure toluene [10]. There was no observed permeation from pure NMP feed. In addition, there was no permeate from a 25 wt. % or a 12 wt. % toluene-containing feed where NMP becomes the solvent (FIG. 1). However, the pressures used were quite low.

Figure 2:
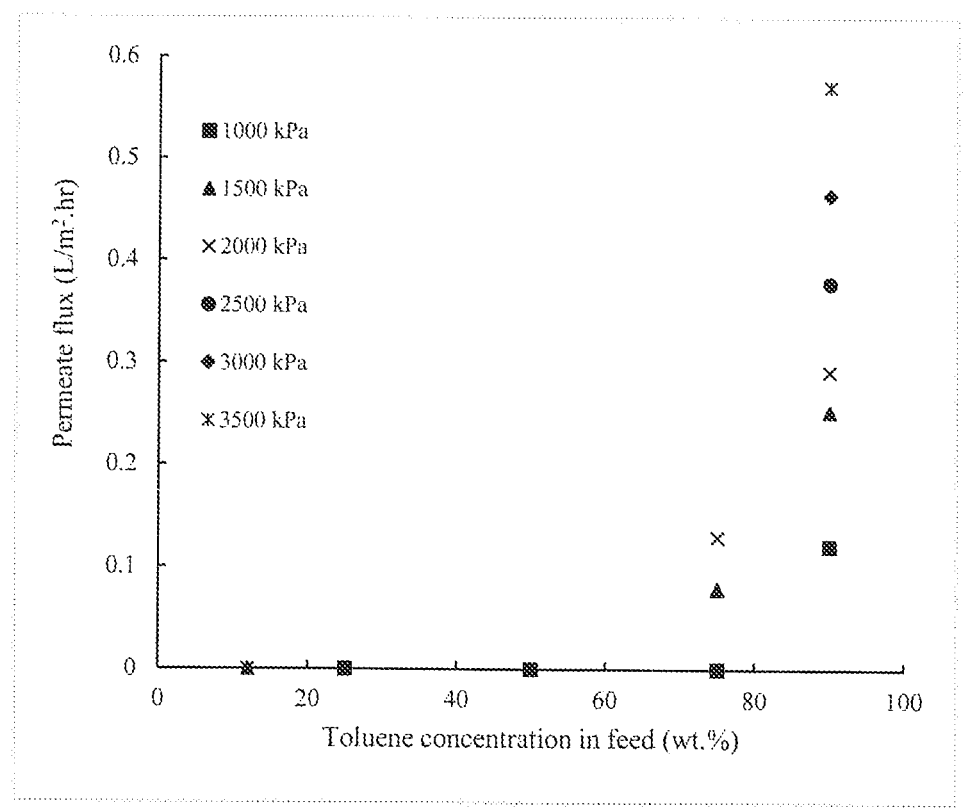
FIG. 2 is a chart illustrating permeate flux ($L/m^2$-hr) vs. toluene in feed (wt. %) of NMP-toluene run through a composite CMS 7 membrane having a thickness of 1.67 μm at 1000 kPa to 3500 kPa.

Referring now to FIG. 2, Permeate flux (L/m$^2$-hr) vs. toluene in feed (wt. %) of NMP-toluene runs through a composite CMS 7 membrane of thickness 1.67 µm at 1000 to 3500 kPa; if there was permeation, the permeate was pure toluene.

Toluene and NMP molecules are likely to have somewhat similar dimensions. On the other hand, NMP is significantly more polar than toluene. Given that CMS-7 polymer is extremely hydrophobic [10], NMP is easily excluded while toluene molecules diffuse through even though their MWs are close.

Figure 3:
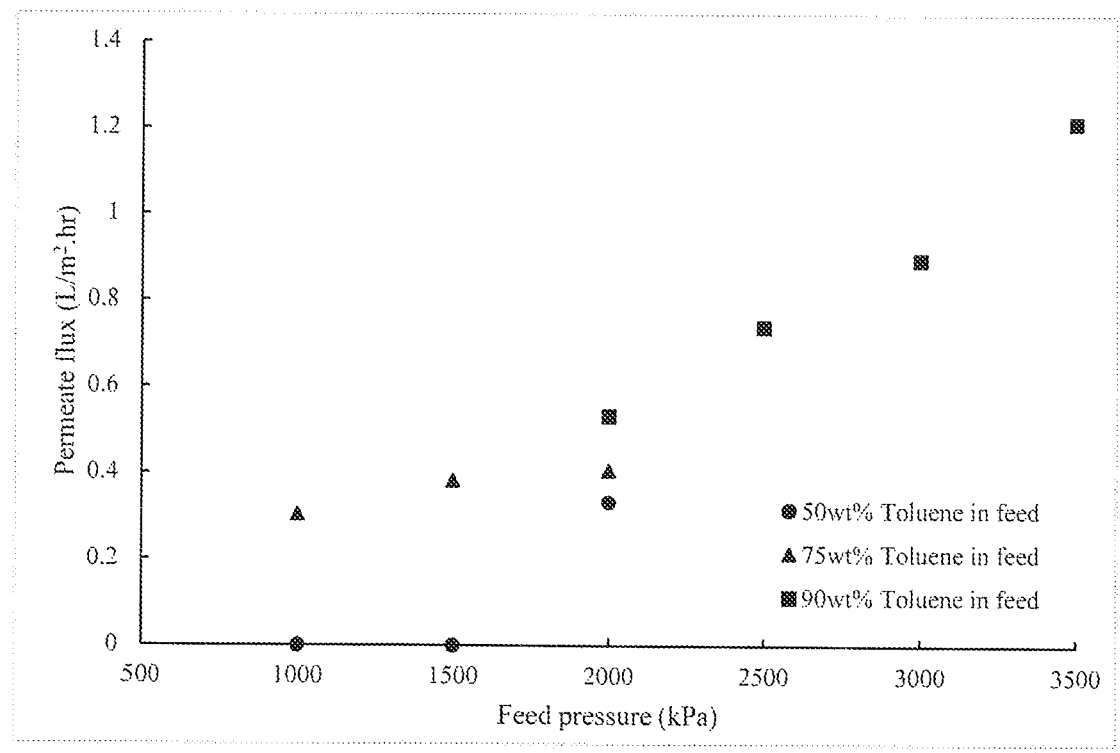
FIG. 3 is a chart illustrating permeate flux vs. feed solution pressure for three mixtures of DMF-Toluene system run through a composite CMS 7 membrane having a thickness of 1.67 μm.

The present inventors now focus on a DMF-toluene system. If there was any permeation for feed compositions in FIG. 3, the permeate was pure toluene. FIG. 3 illustrates the permeate flux as a function of feed pressure in the range of 2000-3500 kPa for a DMF-10 (wt. %)-toluene-90 (wt. %) feed mixture. The permeation flux appears to increase linearly with the feed pressure. An estimate of the osmotic pressure of this solution from Table 1 is 2963 kPa.

The net driving force for permeation is therefore quite low. Correspondingly, the magnitude of the flux is also low where one has to make allowances for the relatively thick membrane used. We need a higher ($\Delta P - \Delta \pi$) for a higher flux. FIG. 3 also shows the flux data for two other feed compositions, toluene 75 wt % (DMF, 25 wt %) and toluene 50 wt % (DMF, 50 wt %). The permeation rates are quite low given the limitations of higher osmotic pressures of the feed solutions. For the 50 wt % toluene-containing feed solutions, there was no observed permeation for the lower pressures used.

Figure 4:
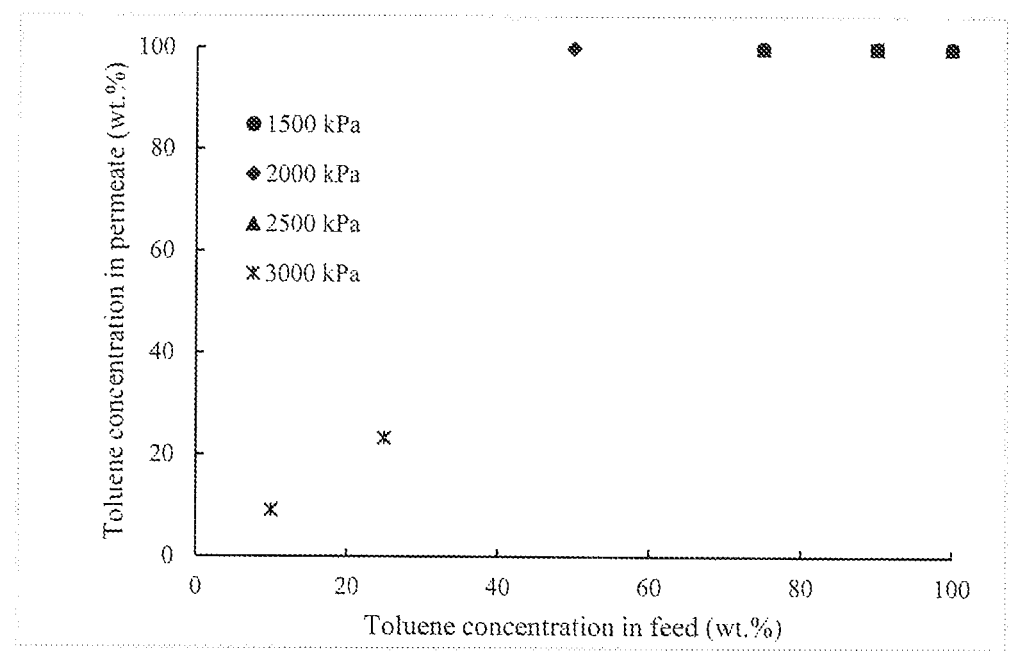
FIG. 4 is a chart illustrating toluene in permeate vs. toluene in feed (wt. %) for DMF-Toluene run through a CMS 7 membrane having a thickness of 1.67 μm.

FIG. 4 summarizes the related observations of the present inventors on permeate compositions over an even wider composition range. For feed compositions varying between 50-90 wt % toluene, the permeate was pure toluene over the pressure range 1500-3000 kPa.

On the other hand, when we are at the other end of the composition scale with 90 and 75 wt % DMF in the feed solution, the system is different; the solute is now toluene and the solvent is DMF. At a somewhat higher pressure of 3000 kPa, the membrane yields a permeate whose composition is identical to the feed since the membrane does not reject toluene. (At lower pressures, there was no permeate for these feed compositions.) The overall permeation results may be explained by similarities between NMP-toluene and DMF-toluene systems. DMF is only slightly smaller than NMP while it displays even higher polarity than NMP.

Figure 5:
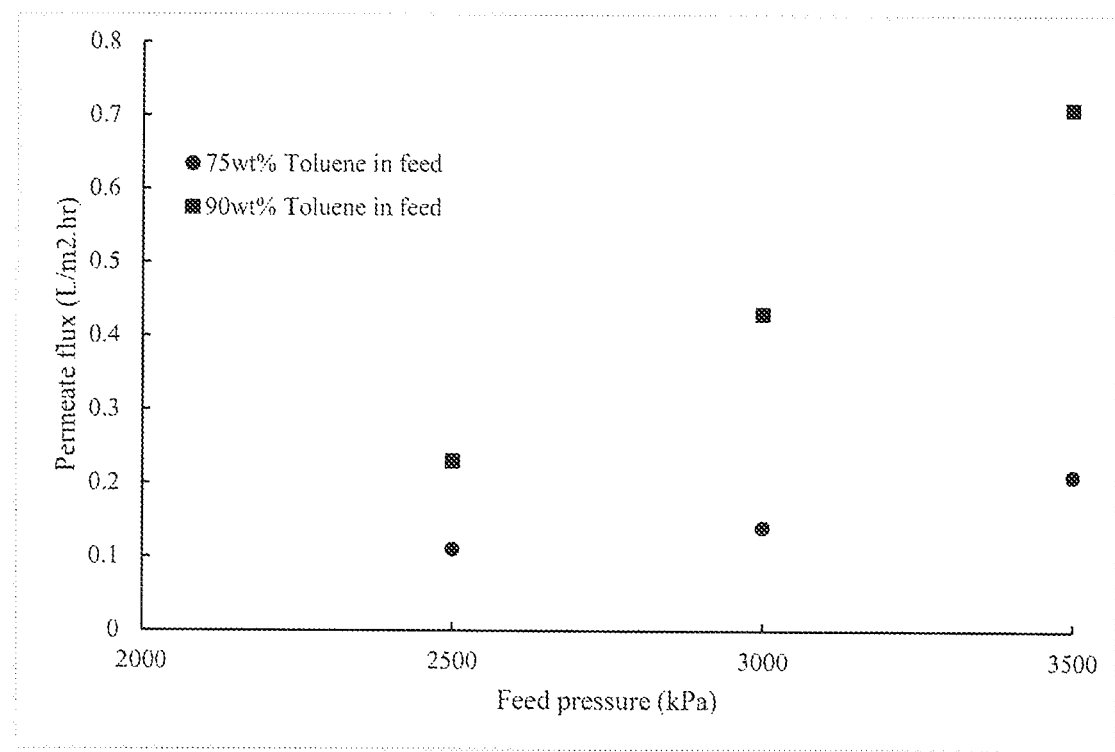
FIG. 5 is a chart illustrating permeate flux vs. feed solution pressure for two DMSO-toluene feed mixtures with a CMS 7 membrane having a thickness of 1.67 μm.

The present inventors continue exploration of binary feed mixtures of larger polar aprotic solvents with toluene. Next, the present inventors consider DMSO-toluene system for two feed compositions: DMSO-25 (wt. %)-toluene-75 (wt. %) and DMSO-10 (wt. %)-toluene-90 (wt. %). In each case, the permeate was pure toluene. Permeation fluxes are plotted against three feed pressures 2500, 3000, and 3500 kPa for these two feed compositions in FIG. 5. The permeation fluxes increase significantly and linearly with the applied pressure. However, the osmotic pressure estimate (Table 1) for 90 wt % toluene-10 wt % DMSO is quite high, 2799 kPa and certainly accounts for the low observed flux levels. Very high polarity hinders entry of DMSO molecules into the polymer FV elements for the applied pressures difference; dimensions of DMSO are close to those of DMF. Hence, we see very similar permeation behavior for the three polar aprotic solvent-toluene systems: NMP-toluene; DMF-toluene; DMSO-toluene. We also believe that we will expect similarly highly selective permeation of other aromatic molecules e.g., xylenes through this membrane when present in mixtures with the polar aprotic solvents mentioned earlier.

The present inventors now explore a different type of system, a smaller polar protic solvent, methanol, instead of toluene, a nonpolar aromatic solvent, in a mixture with the larger polar aprotic solvent NMP. For a 90 wt. % MeOH-10 wt. % NMP mixture run at 2500 and 3000 kPa, the present inventors observed a very tiny peak in the permeates at both pressures. It was below the GC detection level: permeate was essentially pure MeOH.

Figure 6:
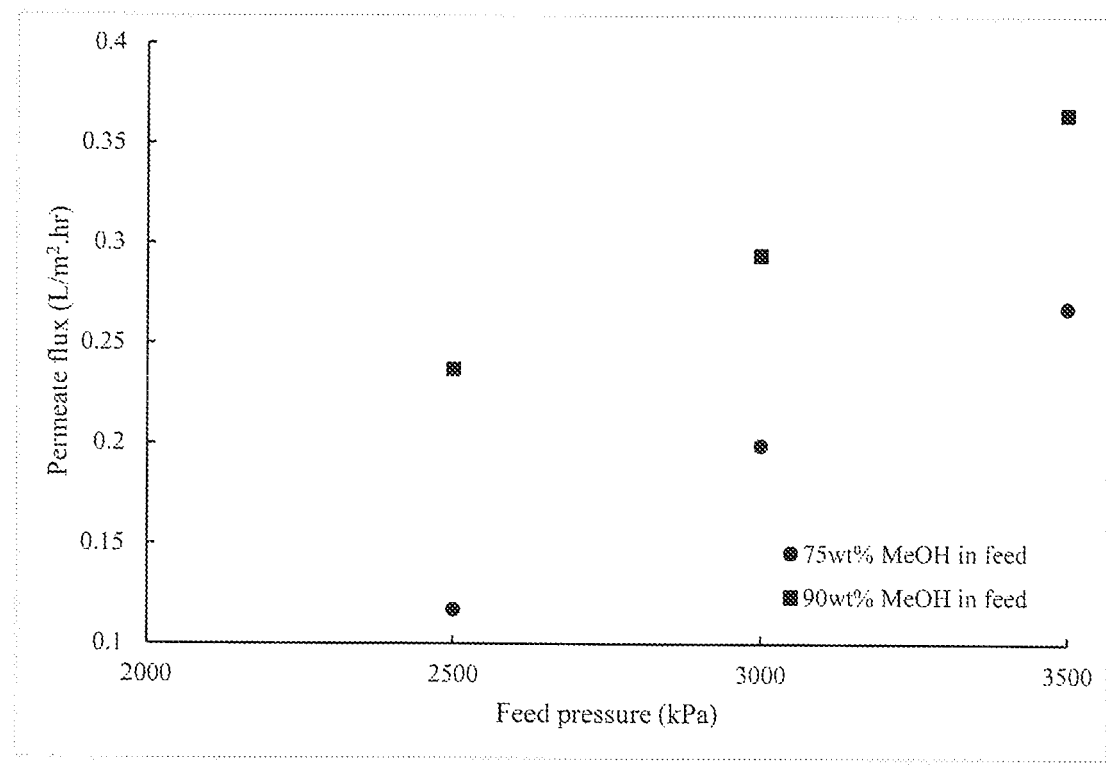
FIG. 6 is a chart illustrating permeate flux vs. feed solution pressure for two different methanol concentrations (wt. %) in methanol-NMP mixtures at feed pressures 2500, 3000, and 3500 kPa for a composite CMS-7 membrane having a thickness of 1.67 μm.
Figure 12:
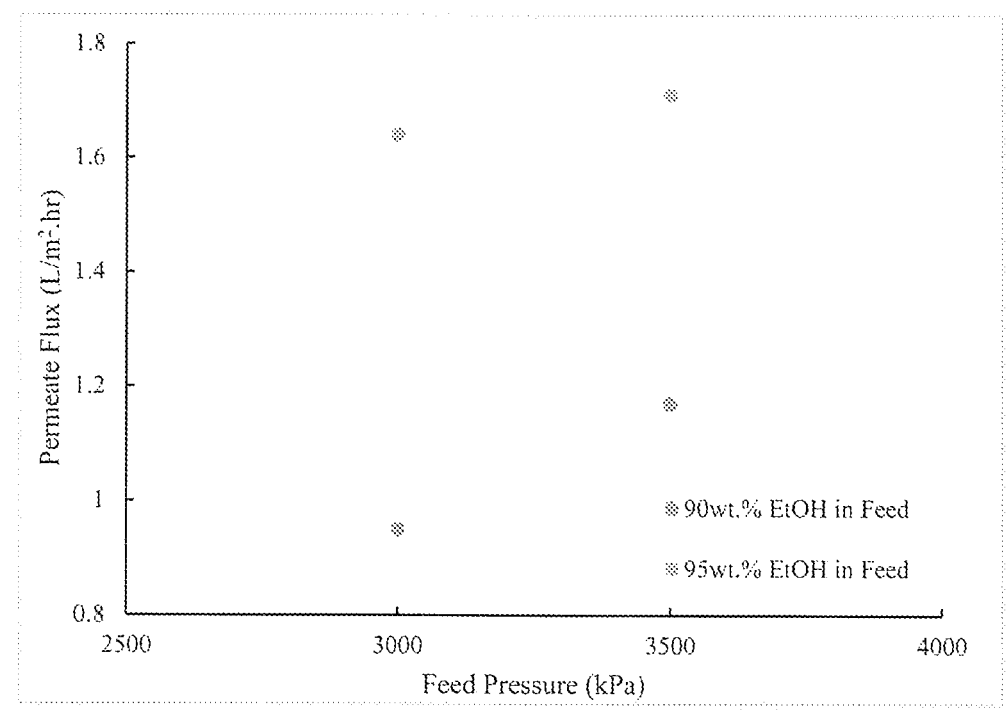
FIG. 12 is a chart illustrating permeate flux ($L/m^2$ hr) vs. feed pressure for an EtOH-NMP mixture through a composite CMS-7 membrane having a thickness of 1.67 μm.
Figure 13:
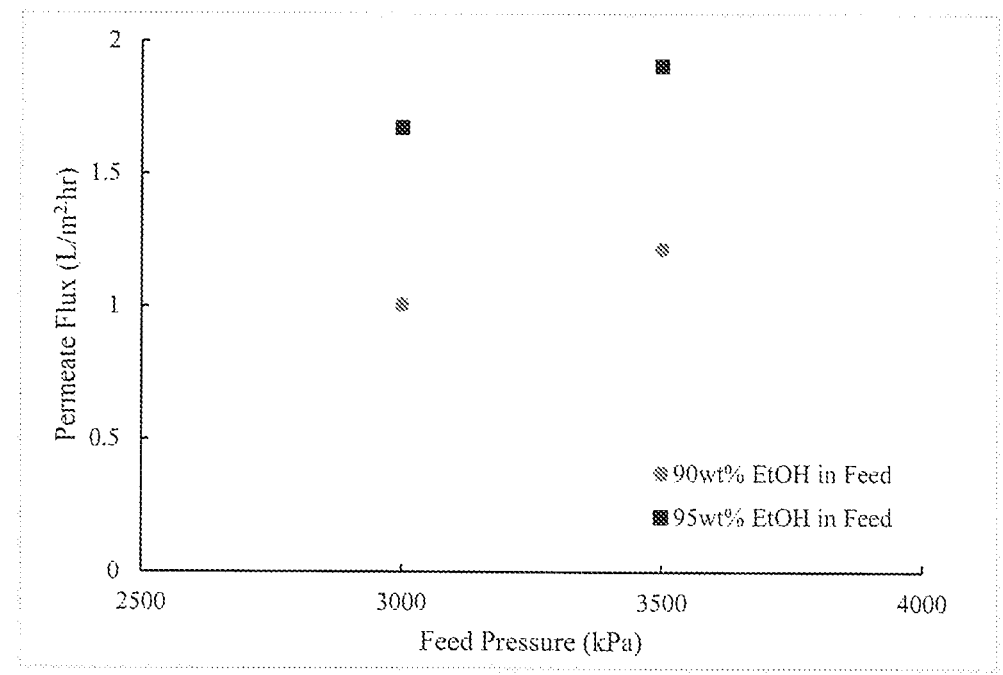
FIG. 13 is a chart illustrating permeate flux ($L/m^2$ hr) vs. feed solution pressure for two different ethanol concentrations (wt %) in ethanol-DMSO mixtures through a composite CMS-7 membrane having a thickness of 0.6 μm.
Figure 14:
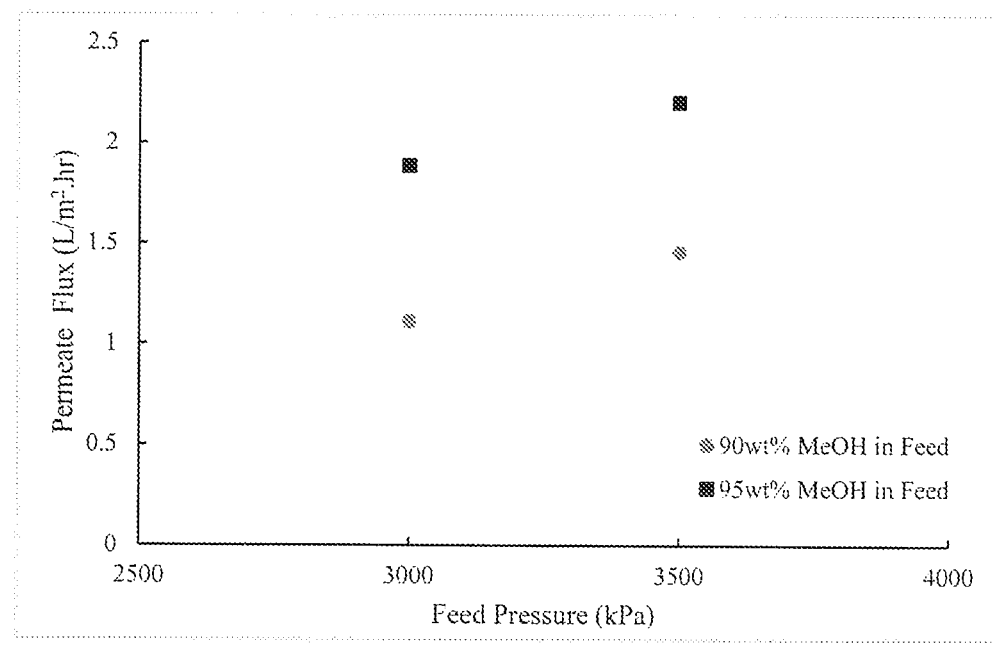
FIG. 14 is a chart illustrating permeate flux ($L/m^2$ hr) vs. feed solution pressure for two different methanol concentrations (wt. %) in methanol-DMSO mixtures through a composite CMS-7 membrane having a thickness of 0.6 μm thick.

For two feeds containing, 90 wt % and 75 wt % methanol, FIG. 6 illustrates this behavior, which suggests that solvent molecule size matters given the not-too-large sizes of the free volume elements in the polymer: methanol is much smaller. Low fluxes are due to the high osmotic pressure of the feed solution: the estimate for the 90 wt % methanol-containing feed is 2026 kPa (Table 1). It may also reflect the effect of possible dimerization of methanol inside the membrane [10]. Further, referring now to FIGS. 12-14, the present disclosure provides further evidence that the perfluoropolymer-based membrane CMS-7 has broad capabilities. We provide results for the following solvent combinations of a polar protic (ethanol, methanol) with a polar aprotic: ethanol-NMP (FIG. 12), ethanol-DMSO (FIG. 13), methanol-DMSO (FIG. 14). Such solvent combinations are frequently encountered in API synthesis. In each case, we obtain a pure permeate of the polar protic solvent which is a smaller molecule.

Figure 15:
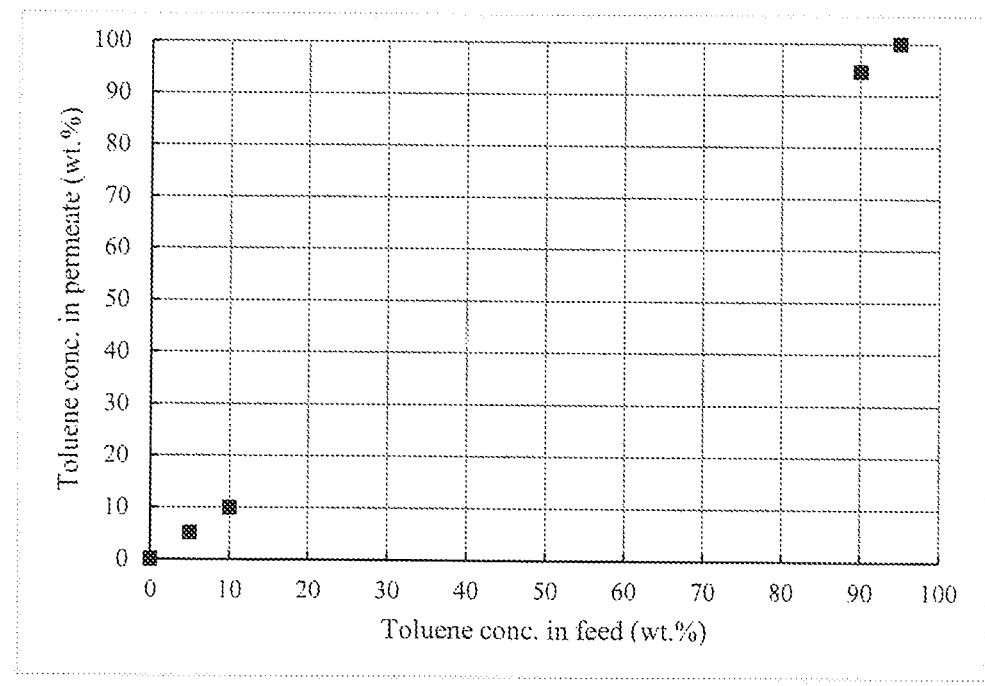
FIG. 15 is a chart illustrating permeate compositions for MeOH-Toluene feed mixtures through a composite CMS-7 membrane having a thickness of 1.67 μm at three different pressures.
Figure 16:
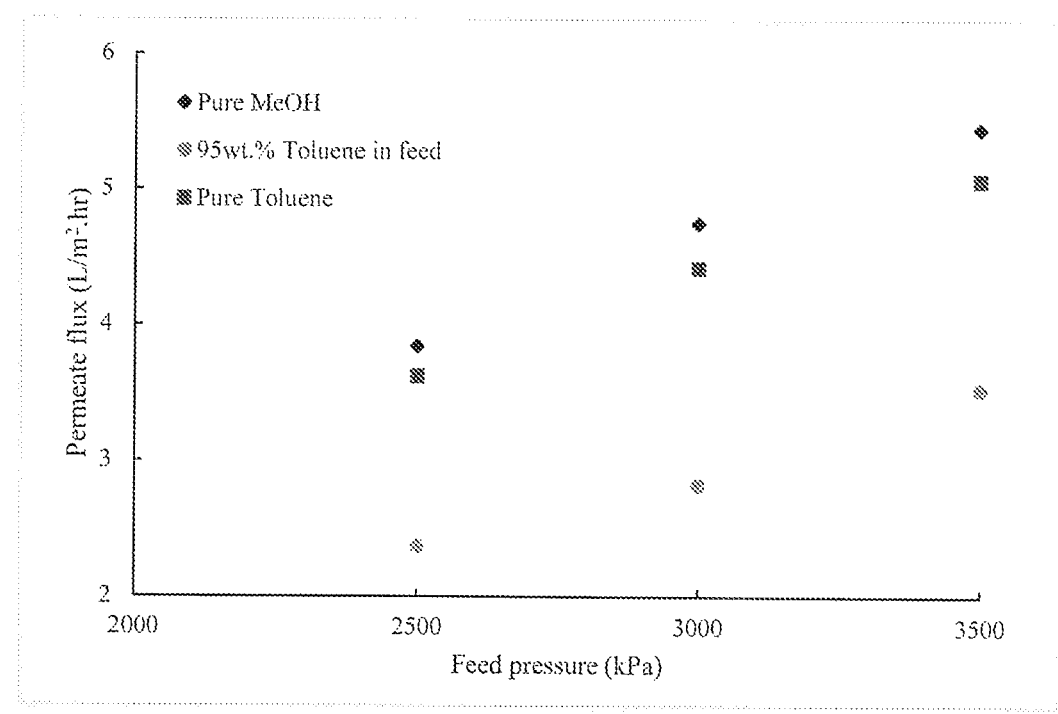
FIG. 16 is a chart illustrating permeate flux ($L/m^2$ hr) vs. feed solution for a 95 wt % toluene-containing feed mixture yielding pure toluene in permeate compared with fluxes of pure methanol and pure toluene used as feed.

In earlier studies with CMS-7 membranes, the present inventors found that both methanol (a polar protic) and toluene (an aromatic) permeate through the CMS-7 membrane with reasonable flux if present in the feed solution as a pure species. Further shown is the permeation separation of mixtures of toluene-methanol (see FIG. 16). This was undertaken to test how polarity-nonpolarity and smaller size of methanol interacts with the highly hydrophobic high free volume environment of the membrane in developing selectivity. FIG. 15 shows that under certain conditions, namely, high toluene concentration in feed, pure toluene is obtained in permeate.

Thus, sorption of solvents in the free volume elements of the perfluoropolymer membrane is important. Selective sorption will be very useful for selective transport of one of the solvent species over another solvent species. In the CMS-3 polymer membrane having a dioxole content of 65%, when exposed to a 50-50 mixture of toluene and methanol, the sorbed liquids after desorption were found to be 95% toluene. The free volume elements of the highly hydrophobic polymer were primarily and selectively occupied by toluene. In the CMS-7 polymer with a dioxole content of 90%, we expect less of that toluene enrichment since increasing dioxole content leads to larger free volume dimensions with somewhat lesser hydrophobicity. It is therefore expected that we will develop a higher selectivity between small nonpolar aromatic (or otherwise) solvents and small polar solvents if the dioxole content decreases. Therefore, we specifically believe, without being bound by theory, that for PDD-TFE copolymers with m-number of groups of perfluoro-2,2-dimethyl-1,3-dioxole and n-number of groups of tetrafluoroethylene, those with dioxole contents in the range of 65-90% are going to be very useful for selective permeation of more hydrophobic solvents in organic solvent RO processes. Further, smaller and linear molecules may preferentially slip through the free volume elements and create selectivity.

The present inventors continue to investigate a somewhat similar theme here in the present disclosure using two protic alcohols one significantly larger than the other. First, an experiment was run with 90 wt % EtOH-10 wt % n-butanol feed at 2500, 3000 and 3500 kPa (FIG. 7).

Figure 8:
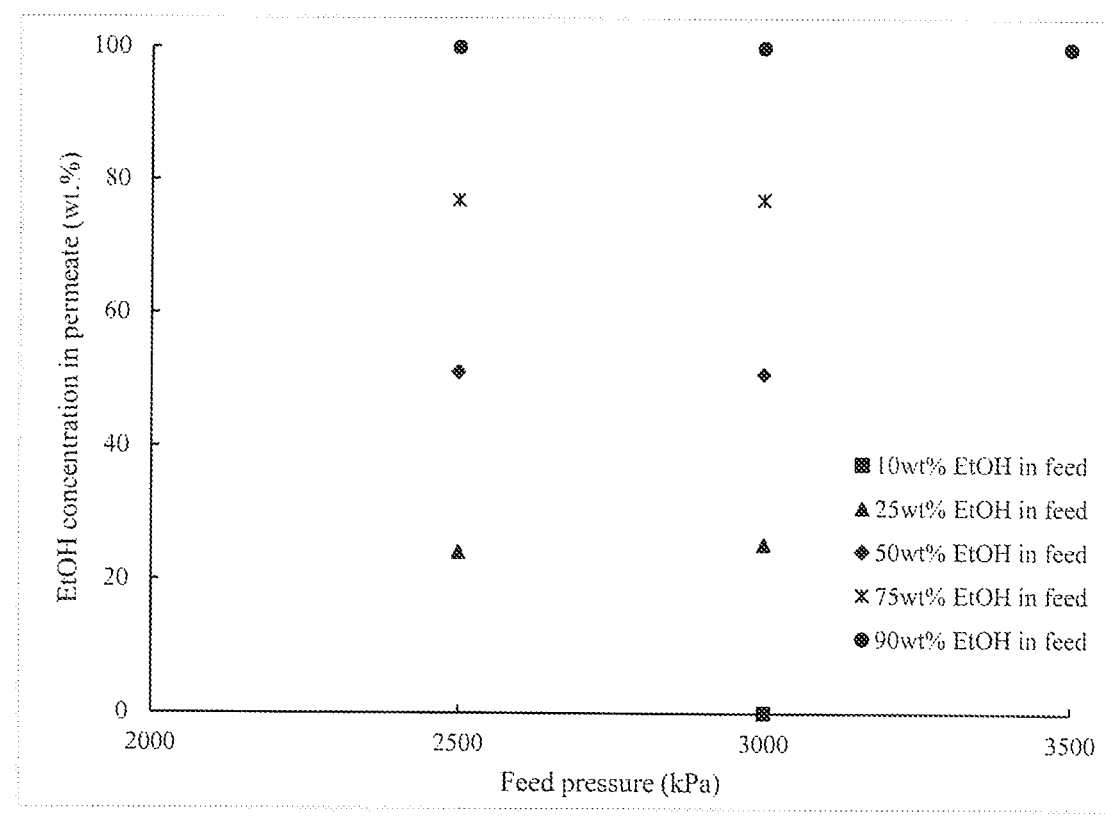
FIG. 8 is a chart illustrating permeate composition in ethanol wt. % vs. feed solution pressure for ethanol-n-butanol mixtures for a composite CMS-7 membrane having a thickness of 1.67 μm.

There was a measurable permeate production; the permeate turned out to be pure ethanol. When however, the experiment was run with a 75 wt % EtOH-25 wt % n-butanol mixture with the same membrane, the permeate showed essentially the same composition as the feed. This run like others was duplicated. The same behavior was observed also for butanol solutions containing 50 wt % ethanol, and 25 wt % ethanol. FIG. 8 illustrates these results for the permeate composition.

Figure 7:
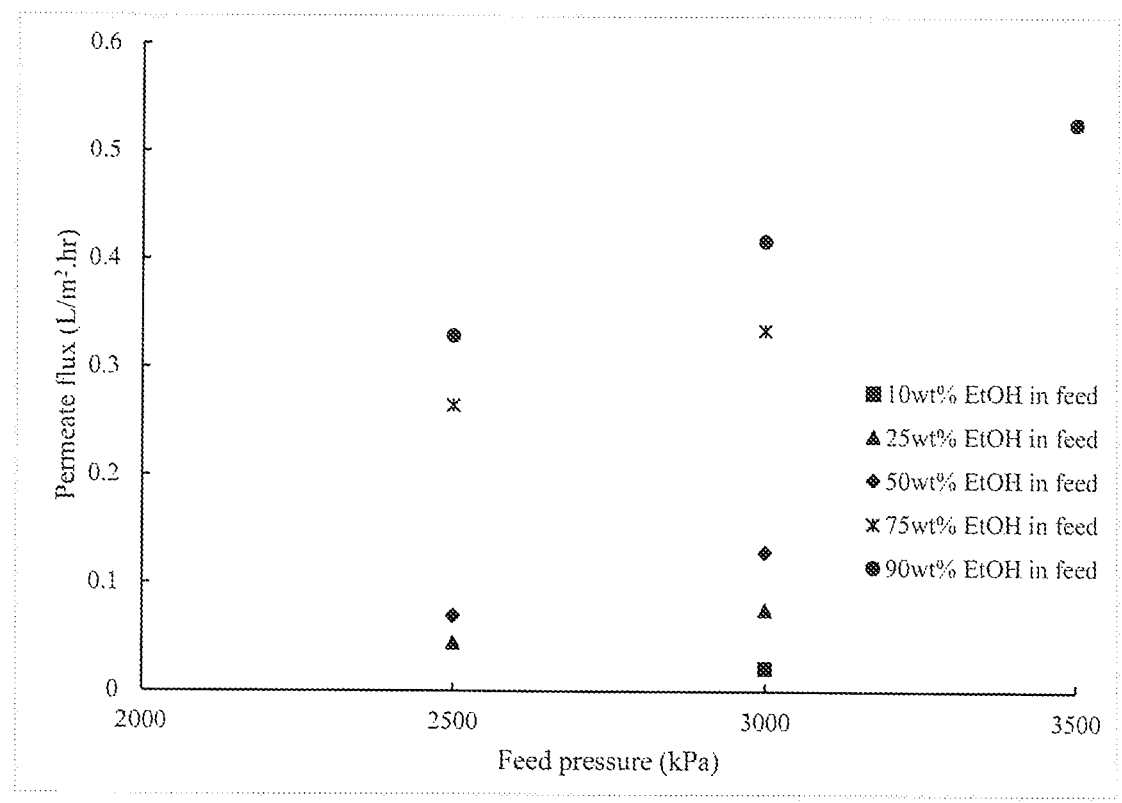
FIG. 7 is a chart illustrating permeate flux vs. feed pressure for a variety of ethanol-n-butanol mixtures for a composite CMS-7 membrane having a thickness of 1.67 μm.

The results shown in FIGS. 7 and 8 do not include the result that tests with pure n-butanol feed at 2500 kPa did not yield any permeate. However, at 3000 kPa, the 10 wt % ethanol in feed yielded pure butanol in permeate. These results illustrate the phenomenon that when the composition of a mixture is overwhelming in terms of a permeable species (~90 wt %) then even if another species exists in a mixture, it is crowded out from the mouth of free volume elements; we get a pure permeate in the dominant species. Here we see this at both ends of the composition spectrum. The composition-dominant species may be larger or smaller; at high concentration ~90 wt %, it comes through without the other. There is another factor at play. The larger butanol is a linear molecule that can slip through narrow FVs.

Figure 9:
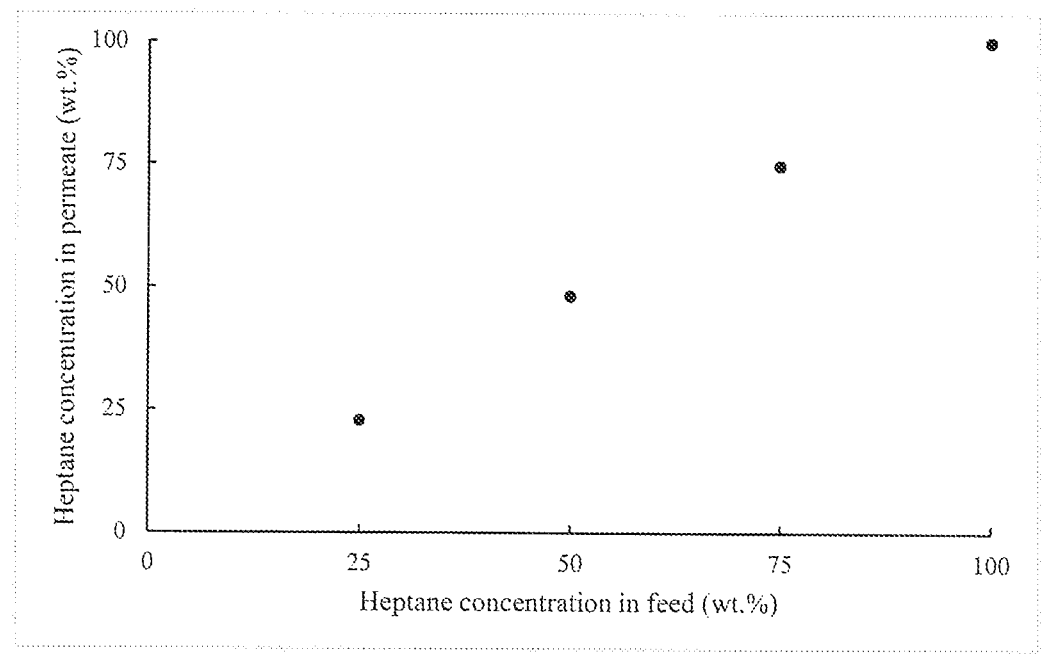
FIG. 9 is a chart illustrating heptane in feed (wt. %) vs. heptane in permeate (wt. %) for heptane-toluene mixture runs through a composite CMS-7 membrane having a thickness of 1.67 μm supported on an e-PTFE support.

Permeation-separation studies were also conducted with mixtures of two smaller size hydrophobic solvents, toluene and n-heptane. The feed mixture composition was varied from pure heptane to pure toluene. Interestingly, there was no observed selectivity in the permeate vis-à-vis the feed mixture. The permeate compositions for all feed mixtures are plotted in FIG. 9 against the feed mixture composition.

The data plotted represent an average of data at all three feed pressures 1000, 1500 and 2000 kPa. This behavior is similar to what was observed with a thinner (0.6 µm) composite membrane of CMS-7 (Chau et al., 2018) [10]. There was no observed selectivity in the permeate vis-à-vis the feed composition. Since the membrane free volume regions cannot accommodate two molecules, single molecule permeation rate of a species appears to be directly proportional to its feed concentration when both species can easily enter the membrane; both pure toluene and pure n-heptane have significant flux through this membrane.

The results where a mixture of NMP and heptane were utilized will be considered now. These two are generally immiscible with limited solubility of heptane in NMP and virtually no solubility of NMP in heptane. As mentioned in the experimental section, two layers were obtained and the top layer was analyzed first. The top layer analyzed in the GC indicated not a trace of NMP and was pure heptane. The permeate from this mixture over a run at 1500 kPa lasting for 3 hr. was also pure heptane. However, as observed earlier [10], the permeate flux was quite high due to high membrane permeability of heptane: 4.27 L/m$^2$-hr.

On the other hand, the bottom layer was found to have a composition of 4.75 (wt. %) of heptane and 95.24 (wt. %) of NMP. This bottom mixture was used as a feed and run at a feed pressure 1500 kPa for ~95 hr yielding a very low flux of 0.063 L/m$^2$-hr. The permeate composition was essentially that of pure NMP (with only a very little trace of heptane) when the bottom layer was run as the feed. Our earlier measurements indicated that there was no permeation of NMP through the membrane over a pressure range of 1000-2500 kPa when pure NMP was the feed (see FIG. 1). The present result showing permeation of NMP may be explained by postulating that the presence of heptane has led to significant swelling, which allows NMP molecules to slip through with only a trace of heptane. Further, a very high concentration of NMP appears to have crowded out the few molecules of heptane due to its low concentration. Whether this behavior will persist over a long period with the very small amount of heptane in the feed is unknown. The supposed swelling may decrease with time and NMP permeation is likely to decrease to zero.

Figure 10:
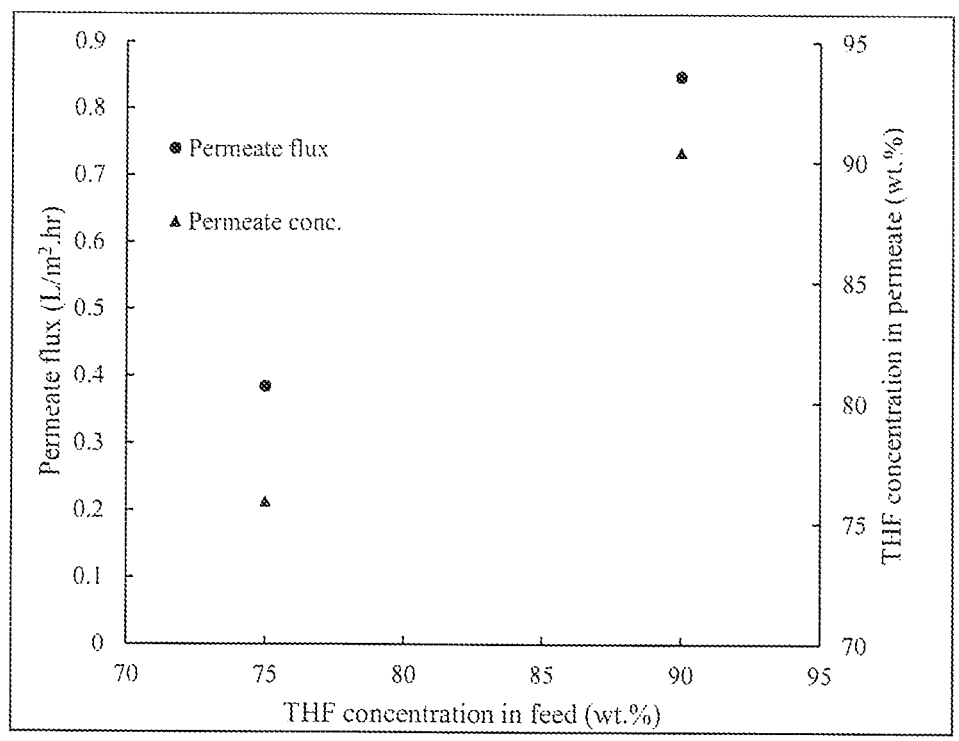
FIG. 10 is a chart illustrating permeate flux ($L/m^2$ hr) vs. THF in feed (wt. %) for THF-NMP runs through a composite CMS-7 membrane having a thickness of 1.67 μm at 2500 kPa.
Figure 11:
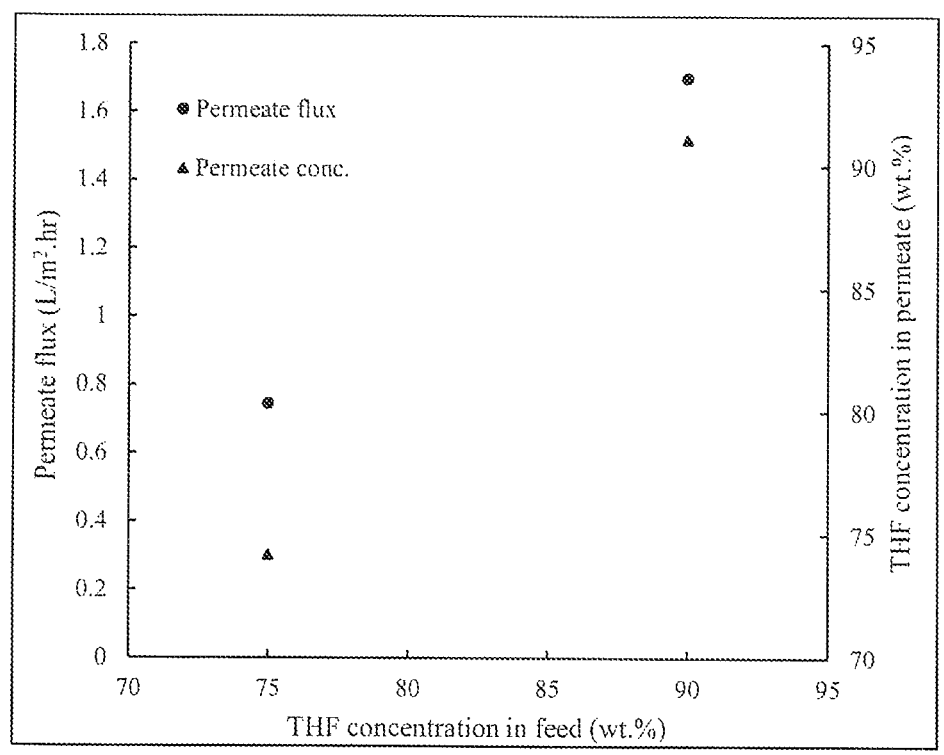
FIG. 11 is a chart illustrating permeate flux ($L/m^2$·hr) vs. THF in feed (wt. %) of NMP-THF runs through a composite CMS-7 membrane having a thickness of 1.67 μm at 3000 kPa.

Two compositions were studied for the system of two polar aprotic solvents: NMP (25 wt. %)-THF (75 wt. %); NMP (10 wt. %)-THF (90 wt. %). Both compositions were run at 2500 kPa and 3000 kPa. Permeate for all runs had essentially the same concentration as the feed as shown in FIGS. 10 and 11. However, the permeate flux seems to have been enhanced beyond the proportionate increase in ΔP. When two polar aprotic solvents are concerned with both having reasonably nonlinear configuration, there is no selectivity. Further, the small swelling of around 1 wt. % with THF (Chau et al., 2018) [10] is enough to let NMP in.

Methanol permeates through this membrane at a relatively slow rate it being highly polar (Chau et al., 2018) [10]. It has been postulated that methanol may be dimerizing in such a hydrophobic membrane environment (Tang et al., 2013 [18]; Jansen et al., 2011 [24]) under pervaporation conditions.

We also know that in pervaporation mode, a similar and tighter membrane, CMS-3, yielded a high flux of water vapor (Tang and Sirkar, 2012) [9]. How would a mixture of methanol and water permeate through CMS-7 membrane in the RO mode of operation?

Table 2 (shown below) provides the results of the permeation performance through a 1.67 µm thick CMS-7 membrane supported on an e-PTFE support. Three feed mixture compositions (in wt. %) were studied: 50 MeOH-50 Water; 75 MeOH-25 Water; 95 MeOH-5 Water. The pressure employed was 2000 kPa; for the last composition 2500 kPa was also used. There was no permeation from the first two feed mixtures even though the run times were quite long. The last composition of 95 (methanol)-5 (water) yielded some permeate. The permeate compositions were quite close to the feed composition. Whether there will be any selectivity at compositions between the second and the third compositions is not known at this time. However, methanol and water are both small molecules and miscible; it is even conceivable that one molecule of each can enter the free volume regions. A feed mixture of 95% (EtOH)-5 (water) was also studied. Its behavior was somewhat similar to that of the corresponding methanol-based feed mixture. One major explanation for obtaining no permeate is that the driving pressure was not high enough to overcome the high feed side osmotic pressure.

TABLE 2

Permeation performances of various methanol-water mixtures and one ethanol-water mixture through a 1.67 μm thick CMS-7 membrane on an ePTFE support

| Feed mixture (wt. %) | Feed pressure (kPa) | Mass of permeate (g) | Time (hr) | Permeate Composition (wt. %) Methanol/Ethanol | Permeate Composition (wt. %) Water | Permeate flux (L/m² · hr) |
|---|---|---|---|---|---|---|
| 50 MeOH-50 Water | 2000 | 0 | 72 | NA | NA | NA |
| 75 MeOH-25 Water | 2000 | 0 | 96 | NA | NA | NA |
| 95 MeOH-5 Water | 2000 | 0.2853 | 30 | 94.6 | 5.4 | 6.73E−02 |
|  | 2500 | 0.4407 | 26 | 94.2 | 5.8 | 1.20E−01 |
| 95 EtOH-5 Water | 2000 | 0.2237 | 40 | 95.9 | 4.1 | 3.98E−02 |
|  | 2500 | 0.8325 | 74 | 94.6 | 5.4 | 7.98E−02 |

The present inventors had checked also whether pure water permeates through such a hydrophobic membrane in the RO mode. The present inventors did not observe any permeation of water for feed pressures in the range of 1000-2000 kPa. The results are provided in Table 3 below herein. The present inventors had also checked whether saline water would permeate through such a membrane. Results in Table 4 below show that there was no permeation as such for the very dilute saline water. This is in strong contrast with the very high flux of water vapor in the pervaporation mode through related membranes (Tang and Sirkar, 2012 [9]; Tang et al., 2017 [23]). The present inventors postulate the following to explain such a behavior. Water exists as a liquid due to substantial hydrogen bonding binding on an average a cluster of five water molecules together. It is difficult for such a large molecular structure to permeate through the maximum free volume dimensions of CMS-7. Such a liquid exists in equilibrium however with a vapor phase of single molecules of water that can be easily transported through the CMS-7/CMS-3 membrane in pervaporation mode. Further, this membrane is extremely hydrophobic. There is no particular interaction between the cluster of hydrogen-bonded water molecules and the membrane surface. On the other hand, in the presence of hydrophilic membrane surfaces or other polar solvents molecules or structure-breaking salts, water structure is likely to undergo some changes; individual water molecule permeation becomes a possibility as we see in the case of methanol-water (Table 2).

TABLE 3

Permeation performances of water through 1.67 μm thick CMS-7 membrane

| Feed pressure (kPa) | Mass of permeate (g) | Time (hr) | Permeate flux (L/m² · hr) |
|---|---|---|---|
| 1000 | 0 | 24 | NA |
| 1500 | 0 | 24 | NA |
| 2000 | 0 | 30 | NA |

TABLE 4

Permeation data for saline water through 1.67 μm thick CMS-7 membrane

| Feed solution | Feed pressure (kPa) | Mass of permeate (g) | Time (hr) | Permeate flux (L/m² · hr) |
|---|---|---|---|---|
| 0.5 wt % NaCl in DI water | 3200 | 0 | 72 | NA |

It is useful to keep another result in perspective based on calculations conducted by Greenlaw et al. (1977) [25]. They showed that a very high-pressure difference of 300 atm is needed in reverse osmosis with a downstream pressure of 1 atm to achieve the level of flux achieved in pervaporation with a very low downstream pressure for the organic solvent hexane.

Prior sorption studies [10] with 25 μm thick CMS-7 samples at room temperature indicated that nonpolar n-heptane introduced the highest amount of swelling of around 2.5% compared to around 1.2-1.3% for methanol, THF, and toluene. That very minor swelling differential along with its linear chain configuration was enough to provide a few times higher flux of pure n-heptane over those of all other pure solvents through a CMS-7 composite membrane [10]. The present inventors have measured the sorption properties of the polar aprotic solvents used here in the CMS-7 membrane material. The results are shown below in Table 5.

Clearly, the sorption amounts are significantly smaller. When these values are taken into account along with their polarity, somewhat larger molecular weight and non-linear molecular configurations, it is not difficult to understand why they may not permeate easily through the tight openings in the largest free volume elements of the highly hydrophobic CMS-7 membrane.

TABLE 5

Solvent sorption measurements for 25 μm thick CMS-7 material at room temperature

| Solvents | % Weight gain after 1 day (%) | % Weight gain after 4 days (%) | % Weight gain after 8 days (%) |
|---|---|---|---|
| NMP | 0.41 | 0.67 | 0.71 |
| DMF | 0.57 | 0.79 | 0.84 |
| DMSO | 0.59 | 0.92 | 0.98 |

Our earlier sorption data for mixtures are also quite useful here. Tang et al. [17] studied the room temperature sorption of pure components as well as mixtures, such as 50% methanol-50% toluene, in a closely related hydrophobic perfluoropolymer membrane, CMS-3. The pure component sorption levels were quite low with toluene having a sorption about twice that of methanol. However, when exposed to a 50-50 methanol-toluene feed mixture, the sorbed amount indicated 99.5% toluene and 0.5% methanol. Since sorption in such perfluoromembrane structures have a significant Langmuir component [26], toluene occupies such Langmuir sites excluding the polar methanol. The present inventors would speculate a very similar behavior here with individual mixtures of polar aprotic solvents, NMP, DMF, DMSO vis-a-vis toluene.

As seen in this study, the maximum flux observed in cases where any separation was achieved was around 0.4 L/m²-hr with an average value of 0.2 L/m²-hr; in a few cases the flux went up to 1.1 L/m²-hr when the pressure was raised to 3500 kPa. However, other permeation fluxes may be present and may largely depend on a thickness of the membrane employed by the system. In some embodiments, the permeation flux may range from about 0.1 L/m² hr to about 50 L/m² hr.

The pure permeated species was primarily toluene, in two other cases correspondingly pure methanol and pure ethanol. There are other cases e.g., toluene-n-heptane, THF-NMP, methanol-water, where the permeate composition was the same as that of the feed. We do not consider these cases since the issue of concentration polarization does not essentially arise. For the completely rejected species i, define now $C^o_{il}$ and $C_{if}$ to be respectively the species i concentration on the feed-side membrane surface and the bulk feed concentration in the feed mixture. Then using results of well-known concentration polarization analysis where $C_{ip}$ is the permeate concentration, we can write based on a pseudo-steady state assumption $$(C^0_{il} - C_{ip}) = (C_{if} - C_{ip}) \exp\left[\frac{|v_y|}{k_{if}}\right]$$

where $|v_y|$ is the permeation velocity thorough the membrane and $k_{if}$ is the mass transfer coefficient of species i in the feed solution over the membrane. The gap between the membrane surface and the bulk solution being imposed on the membrane in stagnation flow mode is around 0.1 cm. For a diffusion coefficient value of the rejected solvents assumed to be around $1\times10^{-5}$ cm²/sec, we obtain a value of $k_{if}$ from stagnant diffusion film model to be $((1\times10^{-5}$ cm²/sec)/0.1 cm)=$1\times10^{-4}$ cm/sec. The value of $|v_y|$ corresponding to 0.2 L/m²-hr is $5.5\times10^{-6}$ cm/sec. Therefore the ratio $\{(C^o_{if})-(C_{ip})/(C_{if})-(C_{ip})\}$ when the value of $C_{ip}$ is zero has the value of exp $[(5.5\times10^{-6}$ cm/sec)/$(1\times10^{-4}$ cm/sec)] i.e., exp $[0.055]$=1.055, 5.5% deviation from the bulk; a flux of 0.4 L/m²-hr would yield a value of 1.10. Due to the very low flux values, the magnitude of concentration polarization is low. Correspondingly, the change in osmotic pressure on the membrane surface is also low. Low flux level was also a result of low values of $(\Delta P-\Delta\pi)$ resulting certainly from low values of applied pressure difference used in this study.

The present inventors need to mention here also the following: not only the permeation flux was low but also the solvent volumes permeated during the experiments were very low unless the present inventors had n-heptane in the feed. The smaller membrane surface area is also responsible for this. The solvent volume permeated as a fraction of the feed volume was less than 1%. Therefore, the present inventors do not envisage much of a change in bulk concentration; the stage cut will be less than 0.01. Although the change in concentration right above the membrane will be higher, the rate of permeation is extremely low and diffusion in stagnation flow mode is likely to be helpful.

We have already mentioned that interfacially polymerized (IP) polyamide membranes will reject oils (MW, 400 Da) and permeate polar extracting solvents such as NMP, DMSO, etc. under appropriate driving pressures for reverse osmosis separation (Black, 1992) [18]. The phenomena reported in the present disclosure are the exact opposite in that the oil/nonpolar component permeates while the polar aprotic ones are rejected. Further, membranes of this study can reject solvent molecules of MW<100 whereas Black's membranes reject oils of MW-400 Da [18]. This behavior is particularly useful when the aprotic species is the major component as is true in aromatics extraction processes in refineries. Molecular dimensional considerations are also important to achieve such separation; smaller polar molecules, such as methanol, ethanol will go through also compared to the other organic solvents somewhat larger in size. Another potentially novel behavior is being postulated here namely, crowding out of a minor species present in very low concentrations from the free volume openings. Even though the extent of solvent swelling in this polymer is very small, it can introduce significant complexities in such a scheme. It is not out of place to note that the selectivity recently achieved by carbon molecular sieve membranes [27] for xylene isomer separation employ primarily size/dimension-based selectivity via diffusion.

A glassy amorphous perfluoropolymer of the PDD-TFF copolymer variety appears to have a remarkable property of highly selective permeation of toluene from a variety of its mixtures with larger polar aprotic solvents such as NMP, DMF, and DMSO. This behavior was demonstrated with a composite membrane of CMS-7 supported on an e-PTFE substrate over a feed pressure range of 1000-3500 kPa. This membrane also permeated pure methanol, a smaller polar protic solvent from certain methanol-NMP, methanol-DMSO, ethanol-NMP, and ethanol-DMSO mixtures. Such highly selective permeation-separation of organic solvent mixtures in the molecular weight range below 100 Da under conditions of RO is novel. Several properties of this polymer are likely to be influential in allowing such a selective separation to be achieved. This polymer is exceptionally inert to a wide variety of organic solvents including aprotic ones; the extent of swelling is limited to the range of 0.6-2.5%. This polymer is highly hydrophobic; thus, polar solvent molecules face significant resistance. Further, the average dimensions of the free volume elements are limited to ~0.65 nm allowing only single solvent molecule permeation. Solvent mixtures permeate through in proportion to their presence in the feed mixture unless other factors dominate. It would be of interest to explore the performance of such a membrane over a wider variety of mixtures of polar aprotic-nonpolar/polar organic solvent mixtures over a much broader range of pressure difference in the RO format.

Although this invention has been described with a certain degree of particularity, it is to be understood that the present disclosure has been made only by way of illustration and that numerous changes in the details of construction and arrangement of parts may be resorted to without departing from the spirit and the scope of the invention.

[1] Muller, E., NMP (Arosolvan) process for BTX separation, Chap. 18.2.1 in T. C. Lo, M. H. I. Baird and C. Hanson (Eds.), Handbook of Solvent Extraction, pp. 523-529, Krieger Publishing Company, Malabar, F L, 1991.

[2] Al-Jimaz, A. S., M. S. Fandary, K. H. A. E. Alkhaldi, J. A. Al-Kandary and M. A. Fahim, Extraction of aromatics from middle distillate using N-Methyl-2-pyrrolidone: experiment, modeling and optimization, I&EC Res., 46(17), 5686-5696 (2007).

[3] BASF (2016)—http://www.cbi.com/getattachment/f8d91886-4916-43d4-a554-ba8201036c9b/Butadiene-Extraction-Technology.aspx.

[4] Fleming, H. L. and C. S. Slater, Pervaporation, in "Membrane Handbook", W. S. W. Ho and K. K. Sirkar (Eds.), Van Nostrand Reinhold, New York, 1992, Chaps. 7-10; reprinted, Springer, 2001.

[5] Shao, P. and R. Y. M. Huang, Polymeric membrane pervaporation, J. Membrane Sci., 287, 162-179 (2007).

[6] Ho, W. S. W., G. Sartori, W. A. Thaler and D. C. Dalrymple, Polyimide aliphatic polyester copolymers (C-2356), U.S. Pat. No. 4,990,275, Feb. 5, 1991.

[7] Marchetti P., M. F. Jimenez Solomon, G. Szekely and A. G. Livingston, Molecular separation with organic solvent nanofiltration: A critical review, Chem. Rev. 114, 10735-10806 (2014).

[8] Vandezande, P., L. E. M. Gevers, I. F. J. Vankelecom, Solvent resistant nanofiltration: separating on a molecular level, Chem. Soc. Rev., 37, 365-405 (2008).

[9] Tang, J. and K. K. Sirkar, Perfluoropolymer membrane behaves like a zeolite membrane in dehydration of aprotic solvents, J. Membrane Sci., 421-422, 211-216 (2012).

[10] Chau, J., P. Basak, J. Kaur, Y. Hu and K. K. Sirkar, Organic solvent nanofiltration with a perfluorodioxole copolymer membrane, Separation and Purification Technology, 199, 233-241 (2018).

[11] Dobrak-Van Berlo, A., I. F. J. Vankelecom and B. Van Der Bruggen, Parameters determining transport mechanisms through unfilled and silicalite-filled PDMS-based membranes and dense PI membranes in solvent resistant nanofiltration: Comparison with pervaporation, J. Membrane Sci., 374, 138-149 (2011).

[12] Bhanushali, D., S. Kloos, C. Kurth, and D. Bhattacharayya, Performance of solvent resistant membranes for non-aqueous systems: solvent permeation results and modeling, J. Membrane Sci., 189, 1-21 (2001).

[13] Buekenhoudt, A., F. Bisignano, G. DeLuca, P. Vandezande, M. Wouters and K. Verhulst, Unravelling the solvent flux behavior of ceramic nanofiltration and ultrafiltration membranes, J. Membrane Sci., 439, 36-47 (2013).

[14] Bertels, D., "Solventgedrag van keramische nanofiltratie membrane", Masters thesis, Katholieke Hogeschool Kempen, Department of Health and Chemistry (2004).

[15] Vangeel, R., "Solventgedrag van keramische nanofiltratie membrane", Masters thesis, Katholieke Hogeschool Kempen, Department of Health and Chemistry (2005).

[16] Alentiev, A. Yu., Yu. P. Yampolskii, V. P. Shantarovich, S. M. Nemser, and N. A. Platé, High transport parameters and free volume of perfluorodioxole copolymers, J. Membrane Sci., 126, 123-132 (1997).

[17] Tang, J., K. K. Sirkar and S. Majumdar, Permeation and sorption of organic solvents and separation of their mixtures through amorphous perfluoropolymer membrane in pervaporation, J. Membrane Sci., 447, 345-354 (2013).

[18] Black, L. E., Interfacially Polymerized Membranes for the Reverse Osmosis Separation of Organic Solvent Solutions, U.S. Pat. No. 5,173,191, Dec. 22 (1992).

[19] Li, X., W. Cai, T. Wang, Z. Wu, J. Wang, X. He, and J. Li, AF2400/PTFE composite membrane for hexane recovery during vegetable oil production, Separation and Purification Technology, 181, 223-229 (2017).

[20] Nemser, S., Applications of membranes in industry: Glassy fluoropolymer Membranes, pp. 1-20, 21$^{st}$ Aharon Katzir-Katchalsky Conference Proceedings, Rehovot, Israel, Sep. 5-8 (1993).

[21] Karan, S., Z. Jiang and A. Livingston, Sub-10 nm polyamide nanofilms with ultrafast solvent transport for molecular separation, Science, 348, 1347-1351 (2015). SI Table S9.

[22] Ham, H. T., Y. S. Choi and I. J. Chung, An explanation of dispersion states of single-walled carbon nanotubes in solvents and aqueous surfactant solutions using solubility parameters, J. Colloid and Interface Science, 286, 216-223 (2005).

[23] Tang, J., K. K. Sirkar and S. Majumdar, Pervaporative dehydration of concentrated aqueous solutions of selected polar organics by a perfluoropolymer membrane, Separation and Purification Technology, 175, 122-129 (2017).

[24] Jansen, J. C., K. Friess, and E. Drioli, Organic vapour transport in glassy perfluoropolymer membranes: A simple semi-quantitative approach to analyze clustering phenomena by time lag measurements, J. Membrane Sci. 367, 141-151 (2011).

[25] Greenlaw, F. W., W. D. Prince, R. A. Shelden and E. V. Thompson, Dependence of diffusive permeation rates on upstream and downstream pressures I. Single component permeant, J. Membrane Sci., 2, 141-151 (1977).

[26] Merkel, T. C., V. Bondar, K. Nagai, B. D. Freeman, Yu. P. Yampol'skii, Gas sorption, diffusion, and permeation in poly(2,2-bis(trifluoromethyl)-4,5-difluoro-1,3-dioxole-co-tetrafluoroethylene), Macromolecules, 32, 8427-8440 (1999).

[27] Koh, D-Y, B. A. McCool, H. W. Deckman, R. P. Lively, Reverse osmosis molecular differentiation of organic liquids using carbon molecular sieve membranes, Science, 353, 804-807 (2016).

What is claimed is:

1. A method to separate organic solvent mixtures, the method comprising the steps of:
   (a) providing a binary solvent mixture of a polar aprotic solvent and a non-polar solvent or a polar aprotic solvent and a polar protic solvent,
   wherein the non-polar solvent is toluene, and
   wherein the polar aprotic solvent is DMF, DMSO, or NMP, and
   wherein the polar protic solvent is methanol or ethanol;
   (b) employing a perfluorodioxole membrane to separate the binary solvent mixture,
   wherein the perfluorodioxole membrane has a dioxole content of about 65% to about 90%;
   (c) applying a pressure to the binary solvent mixture; and
   (d) separating the binary solvent mixture into the polar aprotic solvent and the non-polar solvent or the polar aprotic solvent and the polar protic solvent,
   wherein when the non-polar solvent is toluene and the polar aprotic solvent is DMF, then toluene comprises 50% or more of the binary solvent mixture, and
   wherein when the binary solvent mixture comprises any other combination of the non-polar solvent and the polar aprotic solvent, then toluene, when present, comprises 75% or more of the binary solvent mixture, and
   wherein when the binary solvent mixture comprises any other combination of the polar aprotic solvent and the polar protic solvent, then the polar protic solvent comprises 75% or more of the binary solvent mixture.

2. The method of claim 1 wherein the perfluorodioxole membrane has a thickness of about 0.1 μm to about 1.67 μm.

3. The method of claim 1 wherein a pressure applied to the system is equal to or less than 10,000 kPA.

4. The method of claim 3 wherein the pressure applied to the system is between 1000 and 10,000 kPA.

5. The method of claim 1 wherein the perfluorodioxole membrane comprises a copolymer of perfluoro-2,2-dimethyl-1,3-dioxole and tetrafluoroethylene.

6. The method of claim 1 wherein the binary solvent mixture comprises about 50% to about 99% toluene.

7. A reverse osmosis method to separate organic solvent mixtures, the method comprising the steps of:
（a) providing a solvent mixture comprising a polar aprotic solvent and a non-polar solvent,
　　wherein the polar aprotic solvent is DMF and the non-polar solvent is toluene, and
　　wherein the solvent mixture comprises about 50% to about 99% of toluene;
　　providing a perfluorodioxole membrane configured to separate the solvent mixture;
（b) applying a pressure of at least 1000 kPA to the solvent mixture; and
（d) separating the solvent mixture into the polar aprotic solvent and the non-polar solvent.

8. The method of claim 7 wherein the perfluorodioxole membrane comprises a copolymer of perfluoro-2,2-dimethyl-1,3-dioxole and tetrafluoroethylene.

9. The method of claim 7 wherein the perfluorodioxole membrane has a thickness of about 1.67 μm.

10. The method of claim 7 wherein a permeation flux of the solvent mixture is about 0.1 L/m² hr to about 50 L/m² hr.

11. The method of claim 10 wherein a permeation flux of the solvent mixture is about 0.4 L/m² hr.

12. The method of claim 7 wherein swelling of the perfluorodioxole membrane is between 0.6% and 2.5%.

13. The method 7 wherein an average dimension of a free volume element of the perfluorodioxole membrane is less than 1.00 nm.

14. The method of claim 7 wherein the non-polar solvent permeates the perfluorodioxole membrane, and
　　wherein the polar aprotic solvent does not permeate the perfluorodioxole membrane.

15. The method of claim 7 wherein the perfluorodioxole membrane has a dioxole content of about 65% to about 90%.

* * * * *